US012711813B2

(12) United States Patent
Carzoli

(10) Patent No.: US 12,711,813 B2
(45) Date of Patent: Aug. 18, 2026

(54) REPORTING LOGIN GEO-LOCATION FOR GEO-FENCED REMOTE CLOCK-IN/CLOCK-OUT VERIFICATION OF A REMOTE EMPLOYMENT MANAGEMENT SYSTEM

(71) Applicant: PROCREWZ, INC., Lombard, IL (US)

(72) Inventor: Robert E. Carzoli, Lombard, IL (US)

(73) Assignee: PROCREWZ, LLC, Lombard, IL (US)

( * ) Notice: Subject to any disclaimer, the term of this patent is extended or adjusted under 35 U.S.C. 154(b) by 143 days.

(21) Appl. No.: 17/633,179

(22) PCT Filed: Aug. 5, 2020

(86) PCT No.: PCT/US2020/045063
§ 371 (c)(1),
(2) Date: Feb. 4, 2022

(87) PCT Pub. No.: WO2021/026271
PCT Pub. Date: Feb. 11, 2021

(65) Prior Publication Data

US 2022/0301357 A1 Sep. 22, 2022

Related U.S. Application Data

(60) Provisional application No. 62/883,564, filed on Aug. 6, 2019.

(51) Int. Cl.
*G07C 1/10* (2006.01)
*G06Q 10/1091* (2023.01)
(Continued)

(52) U.S. Cl.
CPC ........... *G07C 1/10* (2013.01); *G06Q 10/1091* (2013.01); *H04W 4/021* (2013.01); *H04W 4/029* (2018.02)

(58) Field of Classification Search
CPC .. G06Q 10/10; G06Q 10/105; G06Q 10/0631; G06Q 10/1091; G06Q 10/06398;
(Continued)

(56) References Cited

U.S. PATENT DOCUMENTS 8,744,933 B2 6/2014 Shortridge
9,020,848 B1 * 4/2015 Ridge ...................... G07C 1/10 705/7.15
(Continued)

FOREIGN PATENT DOCUMENTS

| AU | 2014265052 A1 | 6/2015 |
|---|---|---|
| WO | 2010141891 A2 | 12/2010 |
| WO | 2021011599 A1 | 1/2021 |

OTHER PUBLICATIONS

EP Extended Search Report, Sep. 5, 2022.
(Continued)

*Primary Examiner* — Avia Salman
(74) *Attorney, Agent, or Firm* — Potomac Law Group, PLLC

(57) ABSTRACT

A method for geo-fenced remote clock-in/clock-out verification of a remote employment management system is described. The method includes receiving a login geo-location of a mobile device when a user notifies the mobile device of arrival within a predetermined geo-fenced area of a remote job location. The method also includes verifying the login geo-location of the mobile device within the predetermined geo-fenced area of the remote job location. The method further includes logging the user into the remote employment management system when a current time is within a predetermined amount of time before or at a start time.

20 Claims, 15 Drawing Sheets

(51) Int. Cl.
*H04W 4/021* (2018.01)
*H04W 4/029* (2018.01)

(58) Field of Classification Search
CPC ............. G06Q 40/125; G06Q 10/1053; G06Q 10/063114; G06Q 30/08; G06Q 10/02; G06Q 10/06; G06Q 10/063112; G06Q 10/063116; G06Q 10/0633; G06Q 10/103; G06Q 10/1093; G06Q 10/1097; G06Q 20/065; G06Q 20/3224; G06Q 20/325; G06Q 20/327; G06Q 20/4012; G06Q 2220/00; G06Q 50/40; H04W 4/021; H04W 4/029; H04W 4/12; H04W 4/90; G07C 1/10; G07C 9/28
USPC ............................................................ 705/32
See application file for complete search history.

(56) References Cited

U.S. PATENT DOCUMENTS 9,202,250 B1 12/2015 Palaniappan
10,229,375 B2 3/2019 Davidson et al.
10,657,499 B1 5/2020 Cherry et al.
2013/0198048 A1 8/2013 Tillman, Jr. et al.
2013/0246114 A1* 9/2013 Gala ...................... G06Q 10/06 705/7.15
2013/0290154 A1* 10/2013 Cherry ............... G06Q 10/1091 705/32
2013/0290200 A1 10/2013 Singhal et al.
2014/0249877 A1* 9/2014 Hull ...................... H04W 4/029 705/7.15
2015/0161553 A1 6/2015 Eggleston
2015/0324943 A1 11/2015 Han
2015/0327011 A1 11/2015 Fairbanks
2017/0024683 A1* 1/2017 Bares ............. G06Q 10/063116
2017/0116575 A1 4/2017 DeGoler
2017/0243170 A1 8/2017 Rashid et al.
2018/0033244 A1* 2/2018 Northrup ........... G06Q 30/0238
2018/0046988 A1 2/2018 Kim
2018/0330451 A1 11/2018 Volberg et al.
2019/0057340 A1* 2/2019 Wang ................... G06Q 10/109
2019/0066058 A1 2/2019 Spurgeon et al.
2019/0080335 A1* 3/2019 Degeneffe .......... G06Q 10/1091
2019/0102743 A1 4/2019 Cirrincione et al.
2020/0042936 A1 2/2020 Jain
2020/0293996 A1 9/2020 Wu et al.
2021/0383583 A1* 12/2021 Charlton ................. G06T 11/60

OTHER PUBLICATIONS

Final Office Action from related U.S. Appl. No. 17/665,451, dated Jun. 18, 2024.
Mayan "GPS enabled employee registration and attendance tracking system", 2015.
Examination Report for European Application No. 20850906.7, dated Jul. 3, 2025.
Examination Report for Canadian Application No. 3,150,106, dated Jul. 24, 2025.
Examination Report for Australian Application No. 2020326773, dated Dec. 2, 2025.
Villarama, "Wireless biometric attendance management and payroll system" (Year: 2017).

* cited by examiner

← Andrewtest Love

Job -1/30

Contact Info
555-555-5555

Position
Senior Video

Call Time
09:00 AM

Signed In
Jan 30 2019, 12:07 PM

Adjusted Sign In
Jan 30 2019, 12:07 PM
Edit 472

Signed Out
Jan 30 2019, 12:08 PM

Adjusted Sign Out
Jan 30 2019, 12:08 PM
Edit 474

Notes 476
Add Notes

REPORTING LOGIN GEO-LOCATION FOR GEO-FENCED REMOTE CLOCK-IN/CLOCK-OUT VERIFICATION OF A REMOTE EMPLOYMENT MANAGEMENT SYSTEM

CROSS-REFERENCE TO RELATED APPLICATION

The present application claims the benefit of U.S. Provisional Patent Application No. 62/883,564, filed Aug. 6, 2019, and titled "REPORTING LOGIN GEOLOCATION FOR GEO-FENCED REMOTE CLOCK-IN/CLOCK-OUT VERIFICATION OF A REMOTE JOB MANAGEMENT SYSTEM," the disclosure of which is expressly incorporated by reference herein in its entirety.

BACKGROUND

Field

Aspects of the present disclosure relate, in general, to remote geo-location and, more particularly, to reporting a login geo-location from a target device to a location server to verify the geo-location of the target device within a geo-fenced clock-in verification area of a remote job location for a remote employment management system.

Background

It may be beneficial to obtain the location of a mobile device such as a wireless phone, laptop, tablet, identity tag, etc., at one or more times and to provide the location to some client application or device for the purpose of supporting some service or function. Examples of services and functions include providing navigation instructions to the user of the mobile device, tracking and/or recording the location of some valuable asset, and enabling the mobile device to obtain its own location.

To support the location of mobile devices that have the capability to access wireless networks such as global system for mobile communications (GSM), code division multiple access (CDMA), wideband CDMA (WCDMA), long term evolution (LTE), and Wi-Fi and/or fixed access networks such as packet cable and DSL, a number of position methods and associated positioning protocols have been developed that rely on communications between the mobile device and a location server supported by one or more intervening fixed and/or wireless networks. One such positioning protocol developed by the 3rd Generation Partnership Project (3GPP) in 3GPP Technical Specification (TS) 36.355, which is publicly available, is known as the LTE Positioning Protocol (LPP) and is intended to locate mobile devices that are currently accessing an LTE network.

Unfortunately, tracking the location of a user's mobile device may constitute an invasion of privacy when conducted by an employer. For example, managing a remote work force at off-site job locations is problematic. A remote employment management system, which does not invade employee's privacy, is desired.

SUMMARY

A method for geo-fenced remote clock-in/clock-out verification of a remote employment management system is described. The method includes receiving a login geo-location of a mobile device when a user notifies the mobile device of arrival within a predetermined geo-fenced area of a remote job location. The method also includes verifying the login geo-location of the mobile device within the predetermined geo-fenced area of the remote job location. The method further includes logging the user into the remote employment management system when a current time is within a predetermined amount of time before or at a start time.

A method of reporting a login geo-location for geo-fenced remote clock-in/clock-out verification of a remote employment management system is described. The method includes determining the login geo-location of a mobile device when a user notifies the mobile device of arrival within a predetermined geo-fenced area of a remote job location. The method includes verifying the login geo-location of the mobile device within the predetermined geo-fenced area of the remote job location. The method further includes reporting the login geo-location of the mobile device to a location server to request remote clock-in of a user into the remote employment management system.

A remote employment management system is described. The remote employment management system includes an employment server configured to receive a login geo-location of a mobile device when a remote employee notifies the mobile device of arrival within a predetermined geo-fenced area of a remote job location. The employment server is also configured to verify the login geo-location of the mobile device within the predetermined geo-fenced area of the remote job location. The remote employment management system also includes an employment database. The employment database is configured to perform a login/logout of the remote employee into/from the remote employment management system when a current time is within a predetermined amount of time before or at a start time, or at or after an end time.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
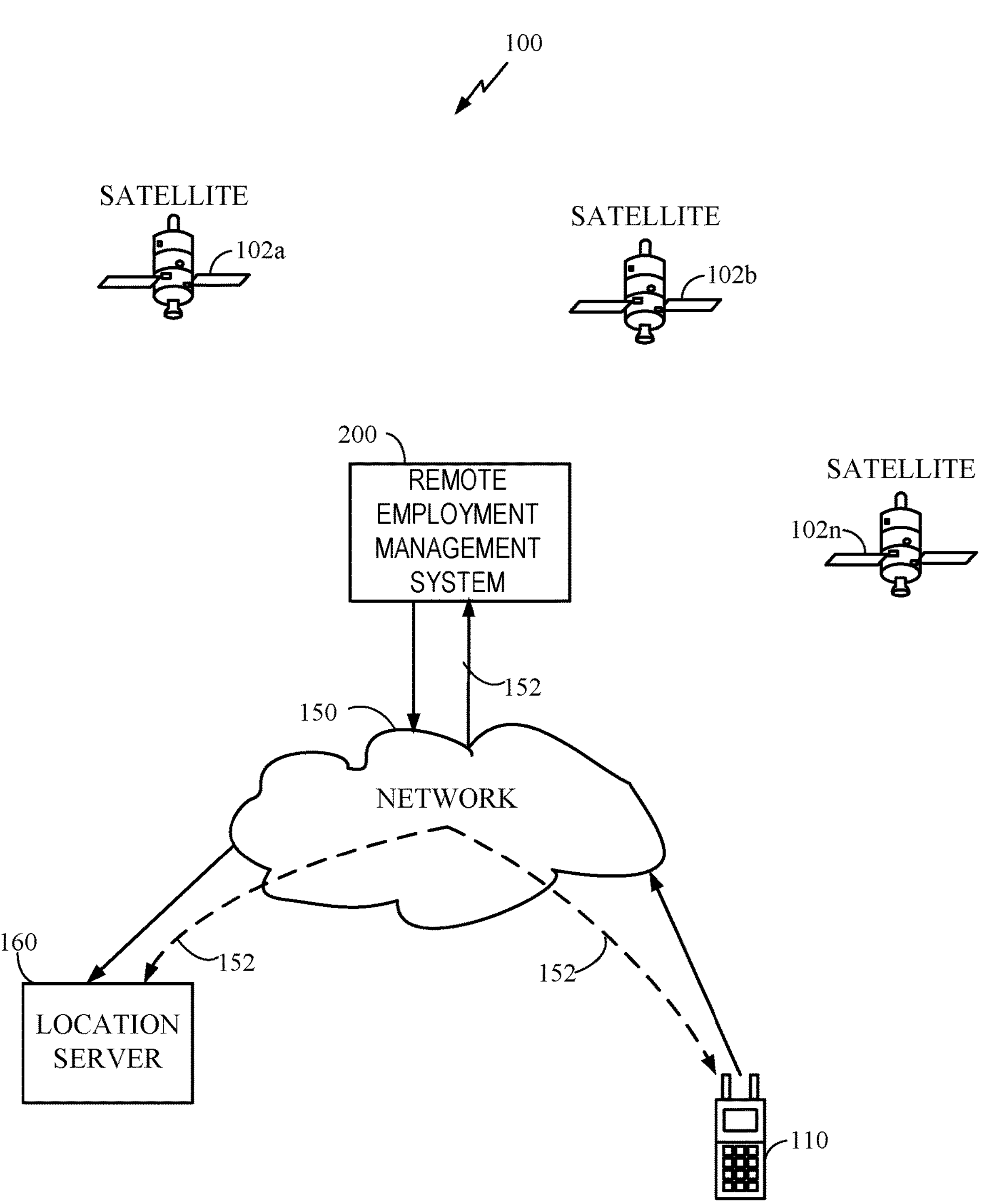
FIG. 1A is a block diagram illustrating a system to report a login geo-location from a mobile device to a location server to verify the geo-location of the mobile device within a predetermined geo-fenced clock-in verification area of a remote job location for a remote employment management system, according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts.

As described herein, the use of the term "and/or" is intended to represent an "inclusive OR," and the use of the term "or" is intended to represent an "exclusive OR." As described herein, the term "exemplary" used throughout this description means "serving as an example, instance, or illustration," and should not necessarily be construed as preferred or advantageous over other exemplary configurations. As described herein, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described herein, the term "proximate" used throughout this description means "adjacent, very near, next to, or close to." As described herein, the term "on" used throughout this description means "directly on" in some configurations, and "indirectly on" in other configurations.

One aspect of the present disclosure reports a login geo-location from a target device to a location server to verify the geo-location of the target device within a predetermined geo-fenced clock-in verification area of a remote job location for a remote employment management system. In particular, the target device may rely on an employee to trigger reporting of the login geo-location. The target device transmits the login geo-location to a location server that uses the login geo-location to verify the login geo-location of the mobile device is within a predetermined geo-fenced clock-in verification area of a remote job location for the remote employment management system. The verified login geo-location can then trigger a remote clock-in by the location server for the remote employment management system if the current time is within a predetermined amount of time before (or at) a start time for the remote job location.

Alternatively, the mobile device verifies that the login geo-location is within the predetermined geo-fenced clock-in verification area of the remote job location before notifying the remote employment management system of a clock-in request. In this configuration, the remote employment management system clocks-in the employee if the current time is within the predetermined amount of time before (or at) a start time for the remote job location by generating a clock-in record in a remote employment database. While the mobile device may rely on a global positioning system (GPS) signal as the login geo-location, in one configuration, the mobile device may rely on a mapping application, a camera, or other like sensor to confirm the mobile device is within the predetermined geo-fenced clock-in verification area of the remote job location for the remote employment management system. Clock-in of the employee may trigger the mobile device of the remote employment management system to display federal and state employment laws based on the remote job location. In an alternative configuration, a job location may be outside the predetermined geo-fenced clock-in verification area, such as a nearby location.

According to aspects of the present disclosure, one possible use for a geo-fenced remote clock-in/clock-out verification of a remote employment management system is a film crew for a sporting event at a sporting stadium (e.g., Wrigley Field in Chicago, Illinois). For example, a job details screen may illustrate an employee is a technical director for a Major League Baseball (MLB) game being played at Wrigley Field. The job detail screen includes a "CLOCK IN" button to trigger the geo-fenced remote clock-in/clock-out verification of the present disclosure. In an alternative configuration, the job location is outside of a geo-fenced area defining the sporting stadium, such as a nearby fan location. In this alternative configuration, a point-of-contact (POC) for the remote job adjusts the clock-in/clock-out for the employee.

FIG. 1A is a block diagram illustrating a system 100 to report a login geo-location from a target device to a location server to verify the geo-location of the target device within a predetermined geo-fenced clock-in verification area of a remote job location for a remote employment management system, according to aspects of the present disclosure. FIG. 1A includes a mobile device 110, a location server 160, and a remote employment management system 200, as further illustrated in FIG. 2. The mobile device 110 may be a wireless terminal, wireline terminal, cell phone, smartphone, laptop, tablet etc., and may be referred to as a user equipment (UE), mobile station (MS), mobile target device, target device, or target. The location server 160 may be a 3rd Generation Partnership Project (3GPP) serving mobile location center (SMLC), a standalone SMLC (SAS) or a 3rd Generation Partnership Project 2 (3GPP2) position determining entity (PDE) or an Open Mobile Alliance (OMA) secure user plane location (SUPL) location platform (SLP) supporting the OMA SUPL solution, or some other location server.

The mobile device 110 includes access to a network 150. The network 150 may be a wireless or fixed network. The location server 160 is also attached to the network 150. An employment server (not shown in FIG. 1A) may be connected to the location server 160 to request and receive a verified geo-location of the mobile device 110 within a predetermined geo-fenced clock-in verification area of a remote job location. A login geo-location of the mobile device is verified when a longitudinal position and a latitudinal position of the mobile device 110 fall within the longitudinal and latitudinal positions of the predetermined geo-fenced clock-in verification area of the remote job location. In reality, the location server 160 may reside inside the network 150 or external to the network 150 within the remote employment management system 200, and have communications access to the network 150. Alternatively, the location server 160 and/or the remote employment management system 200 may reside inside or are attached to another network (not shown) that is reachable via the network 150. GPS or global navigation satellite system (GNSS) satellites 102*a*-102*n* are detectable by the mobile device 110.

Position location signals may be transmitted from satellites 102*a*-102*n*. The position location signals transmitted from the satellites 102*a*-102*n* may be received by the network 150. The network 150 forwards the satellite information to the location server 160, which may transmit part or all of the satellite information as assistance data to any number of receivers and/or transceivers and/or servers and/or terminals. The network may transmit part or all of the satellite information as assistance data to the mobile device 110 whose user may be seeking to establish a position location using satellite position system (SPS) technology included in the mobile device 110. Location related data, such as assistance data and location measurement data, may also be transmitted between the mobile device 110 and the location server 160.

In aspects of the present disclosure, transfer of assistance data (e.g., satellite information) and/or location information between the mobile device 110 and the location server 160 may employ a communications capability 152 (e.g., a connection or session) through the network 150 (and through additional networks if the location server 160 (or an employment server (not shown)) is connected to another network and not to the network 150). Communications capability 152 may use a transport protocol, such as the Transmission Control Protocol (TCP) and Internet Protocol (IP) or protocols associated with and defined for the particular type (e.g., GSM, CDMA, WCDMA, or LTE) of the network 150 and may employ a remote login geo-location verification protocol supported by the location server 160 and the mobile device 110, but not necessarily by the network 150.

Figure 1B:
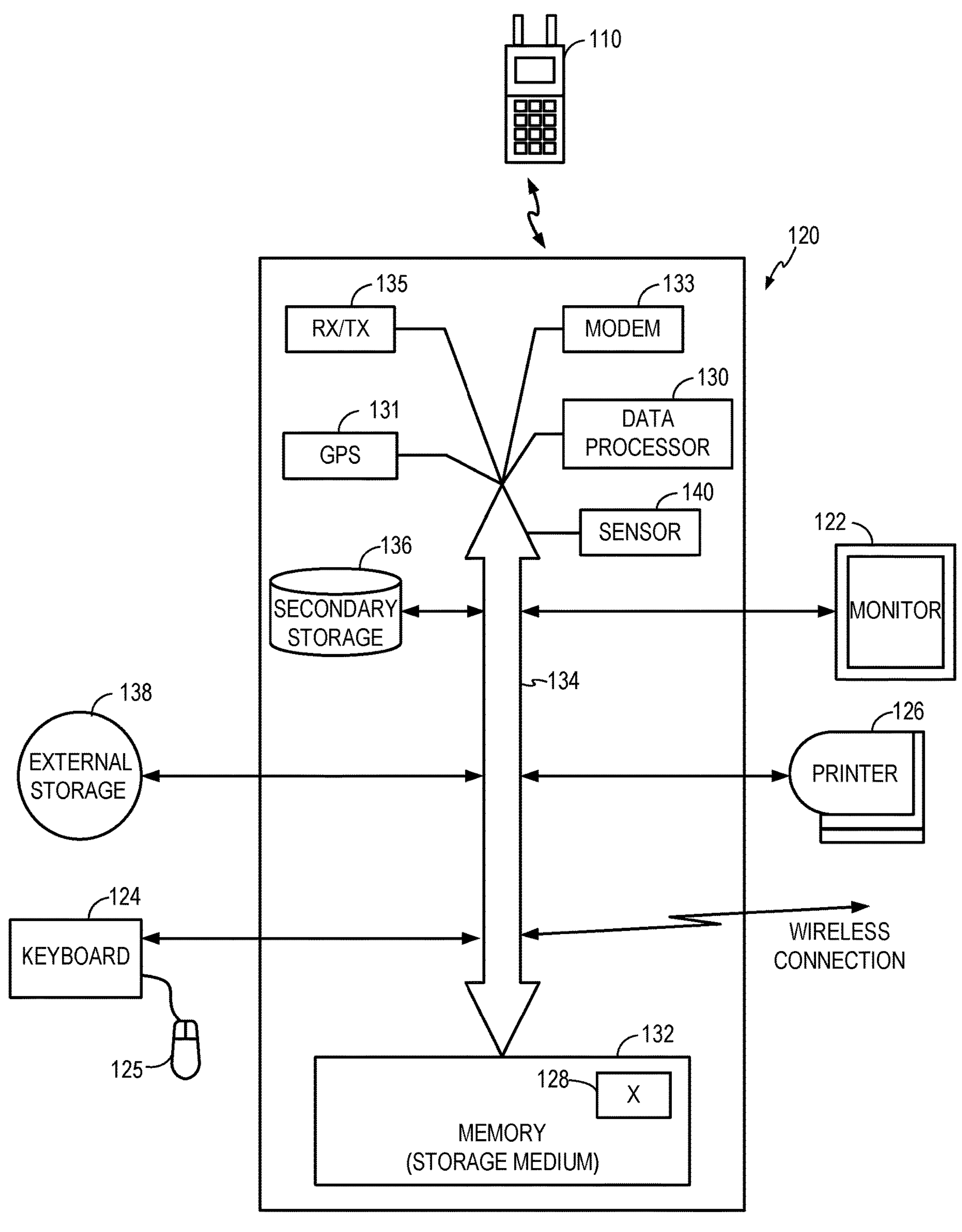
FIG. 1B is a block diagram illustrating a mobile device having a computer processing system to report a login geo-location of the mobile device to a location server in response to a user of the mobile device for the remote employment management system of FIG. 1A, according to one aspect of the present disclosure.

The mobile device 110 may include local sensors 140 (as illustrated in FIG. 1B), such as a camera. Those skilled in the art will appreciate the local sensors 140 may be located within the mobile device 110 or may be communicatively attached to the mobile device 110 to work in conjunction with the mobile device 110. Data related to a login/logout geo-location, including a relative change in geo-location, may be obtained from the local sensors 140. In addition, the mobile device 110 may determine a relative geo-location or a change in geo-location. For example, the mobile device 110 may make use of a series of photographs or video to estimate a login/logout geo-location and verify the login geo-location is within the predetermined geo-fenced clock-in verification area of a remote job location. For example, a photograph of a section of a parking lot surrounding the remote job location may verify the login geo-location of the mobile device 110 is within the predetermined geo-fenced clock-in verification area of a remote job location.

FIG. 1B is a block diagram illustrating the mobile device 110 having a computer processing system 120 to report a login geo-location of the mobile device 110 to the location server 160 in response to a user of the mobile device 110 for the remote employment management system of FIG. 1A, according to one aspect of the present disclosure. As shown, the computer processing system 120 is operatively connected to the mobile device 110. In one aspect, the computer processing system 120 is housed within the mobile device 110. The computer processing system 120 is adapted to receive, store, process, and execute instructions at least in connection with location information, including data related to a login/logout geo-location.

The components of the computer processing system 120 may include local sensors 140, a data processor 130, a position location receiver (e.g., a GPS receiver) 131, a storage medium 132, a wireless modem 133, and a cellular receiver/transceiver 135, all coupled by an interconnect link 134 (e.g., a bus). The storage medium 132 is a machine- or computer-readable medium and may include, but is not limited to, volatile memories such as dynamic random-access memory (DRAM), static random-access memory (SRAM), as well as non-volatile memories such as read-only memory (ROM), flash memory, erasable programmable read-only memory (EPROM), electrically erasable programmable read-only memory (EEPROM), and bubble memory.

In this configuration, a secondary storage 136, an external storage 138, and output devices, such as a monitor 122, may be included with the mobile device 110. In an optional configuration, input devices such as a keyboard 124, a mouse 125, and a printer 126 are included with the mobile device 110. The secondary storage 136 may include machine-readable media such as, but not limited to, a hard disk drive, a magnetic drum, and a non-volatile memory (NVM), such as a solid-state drive (SSD), including a flash memory drive. The external storage 138 may include machine-readable media, and even other computers connected via a communications line.

The distinction between the secondary storage 136 and external storage 138 is primarily for convenience in describing the use of machine-readable memory. As such, a person skilled in the art will appreciate that there is substantial functional overlap between and among the components. Computer software and user programs can be stored in the storage medium 132 and the external storage 138. Executable versions of computer software may be read from the storage medium 132 and loaded for execution directly into volatile storage medium, executed directly out of non-volatile storage medium, or stored on the secondary storage 136 prior to loading into a volatile storage medium for execution.

The computer processing system 120 illustrated in FIG. 1B of the mobile device 110 includes a set of computer instructions (in this document, "instructions") 128 for implementing the methods of the remote login geo-location verification within a predetermined geo-fenced clock-in verification area of a remote job location, described in this document. The instructions 128 are illustrated in FIG. 1B diagrammatically solely as an aid in understanding the method of the remote login geo-location verification system described in this document. The instructions 128 may be stored in various internal memory or may be implemented in hardware. The instructions 128 may also be included in a computer processing system of a computer located external to the mobile device 110, for example, on a secured intranet, on the Internet, or at a base station (not shown), from which they may be transmitted to the mobile device 110. Data associated with the instructions 128 may be received, stored, processed, and transmitted to others of the mobile device 110; however, only the mobile device 110 is illustrated for the sake of clarity.

Figure 1C:
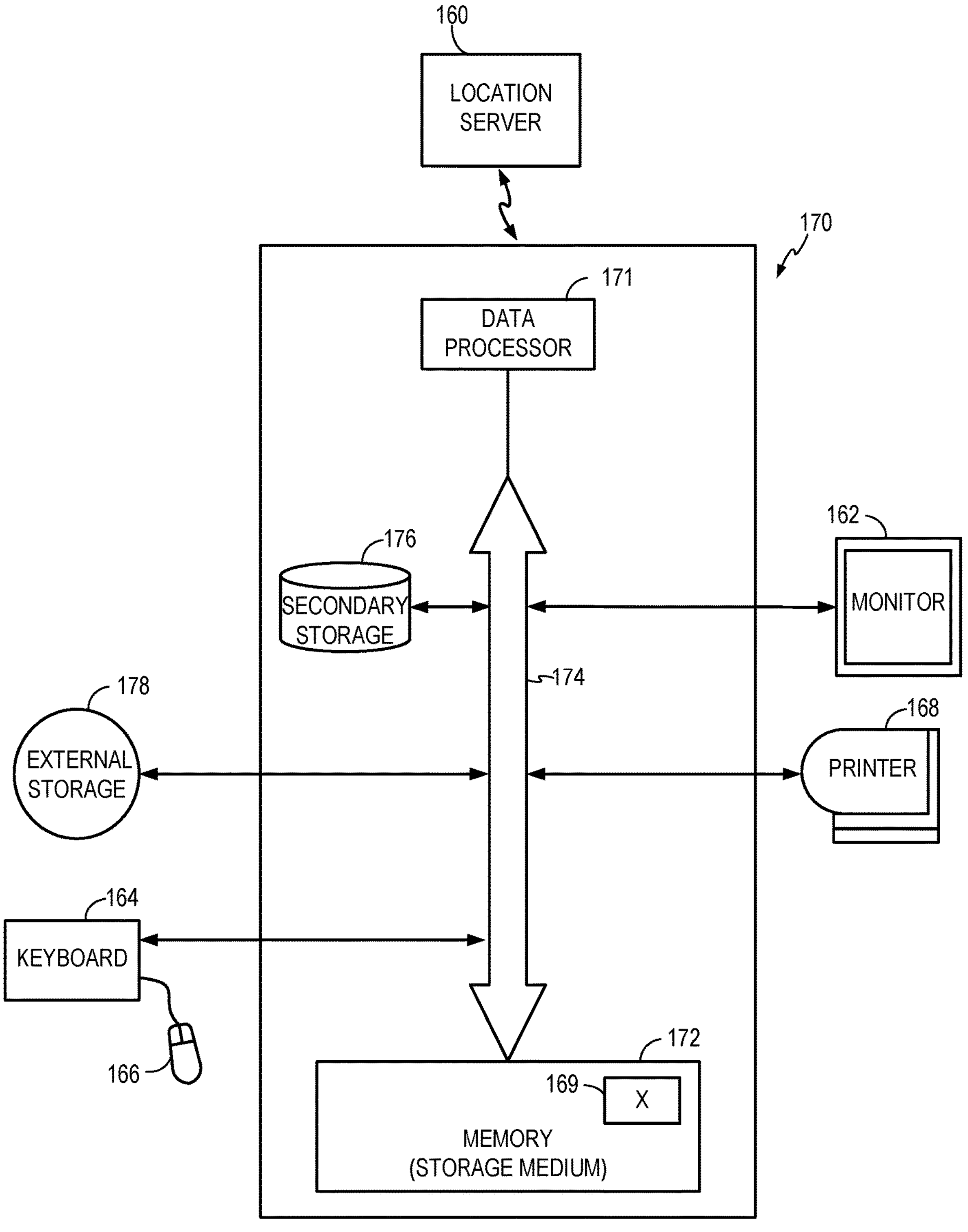
FIG. 1C is a block diagram illustrating a location server having a computer processing system to verify the geo-location of a mobile device within a predetermined geo-fenced clock-in verification area of a remote job location for the remote employment management system of FIG. 1A, according to aspects of the present disclosure.

FIG. 1C is a block diagram illustrating the location server 160 having a computer processing system 170 to verify the login geo-location of the mobile device 110 within a predetermined geo-fenced clock-in verification area of a remote job location for the remote employment management system of FIG. 1A, according to aspects of the present disclosure. In one aspect, the computer processing system 170 is housed in the location server 160. The computer processing system 170 is adapted to receive, store, process, and execute instructions at least in connection with geo-location login/logout position data including position signals, and base station position location signals that include position location data.

The components of the computer processing system 170 may include a data processor 171 and a storage medium 172 coupled by a bus 174. The storage medium 172 is a machine- or computer-readable medium and may include, but is not limited to, volatile memories such as DRAM, and SRAM, as well as non-volatile memories such as ROM, FLASH, EPROM, EEPROM, and SSD memory (e.g., flash memory).

In addition, a secondary storage 176, an external storage 178, and output devices such as a monitor 162 may be included with the location server 160. In another configuration, an input device such as a keyboard 164, a mouse 166, and a printer 168 may be included with the location server 160. The secondary storage 176 may include machine-readable media such as, but not limited to, a hard disk drive, a solid-state drive (SSD), or other drive based memory. The external storage 178 may include machine-readable media such as removable memory cards, and even other computers connected via a communications line.

The distinction between secondary storage 176 and the external storage 178 is primarily for convenience in describing the use of machine-readable memory. As such, a person skilled in the art will appreciate that there is substantial functional overlap between and among these components. Computer software and user programs can be stored in the storage medium 172 and the external storage 178. Executable versions of computer software can be read from storage medium 172 such as a non-volatile storage medium, loaded for execution directly into volatile storage medium, executed directly out of non-volatile storage medium, or stored on the secondary storage prior to loading into volatile storage medium for execution.

The computer processing system 170 illustrated in FIG. 1C of the location server 160 includes a set of computer instructions (in this document, "instructions") 169 for implementing the methods of the remote login/logout geo-location verification system 100 described herein. The instructions 169 may be stored in various internal memory or may be implemented in hardware. The instructions 169 may also be included in a computer processing system of a computer located external to the location server 160, for example, on a secured intranet, on the Internet, or at a base station, from which they may be transmitted to the location server 160.

According to one aspect of the present disclosure, a target device (such as the mobile device 110 of FIG. 1A) may report a login/logout geo-location from the mobile device 110 to the location server 160. In this aspect of the present disclosure, the location server 160 verifies the login/logout geo-location of the mobile device 110 is within a predetermined geo-fenced clock-in/clock-out verification area of a remote job location. In particular, the mobile device 110 may rely on an employee to trigger reporting of the login/logout geo-location to the location server 160. The mobile device 110 transmits the login/logout geo-location to the location server 160.

In this configuration, the location server 160 verifies the login/logout geo-location of the mobile device 110 is within a predetermined geo-fenced clock-in/clock-out verification area of a remote job location for the remote employment management system 200 of FIG. 1A. The verified login/logout geo-location can then trigger a remote clock-in for the remote employment management system 200 of FIG. 1A (or an employment server) if the current time is within a predetermined amount of time before (or at) a start time for the remote job location.

In one configuration, the mobile device 110 may make use of a series of photographs or video to estimate a login/logout geo-location. The mobile device verifies the login/logout geo-location is within the predetermined geo-fenced clock-in verification area of a remote job location. For example, a photograph of a section of a parking lot surrounding the remote job location may verify the login/logout geo-location of the mobile device 110 is within the predetermined geo-fenced clock-in verification area of the remote job location. This configuration may be useful for remote job locations that begin outside of a predetermined geo-fenced clock-in/clock-out verification area, such as filming at a fan location.

Figure 2:
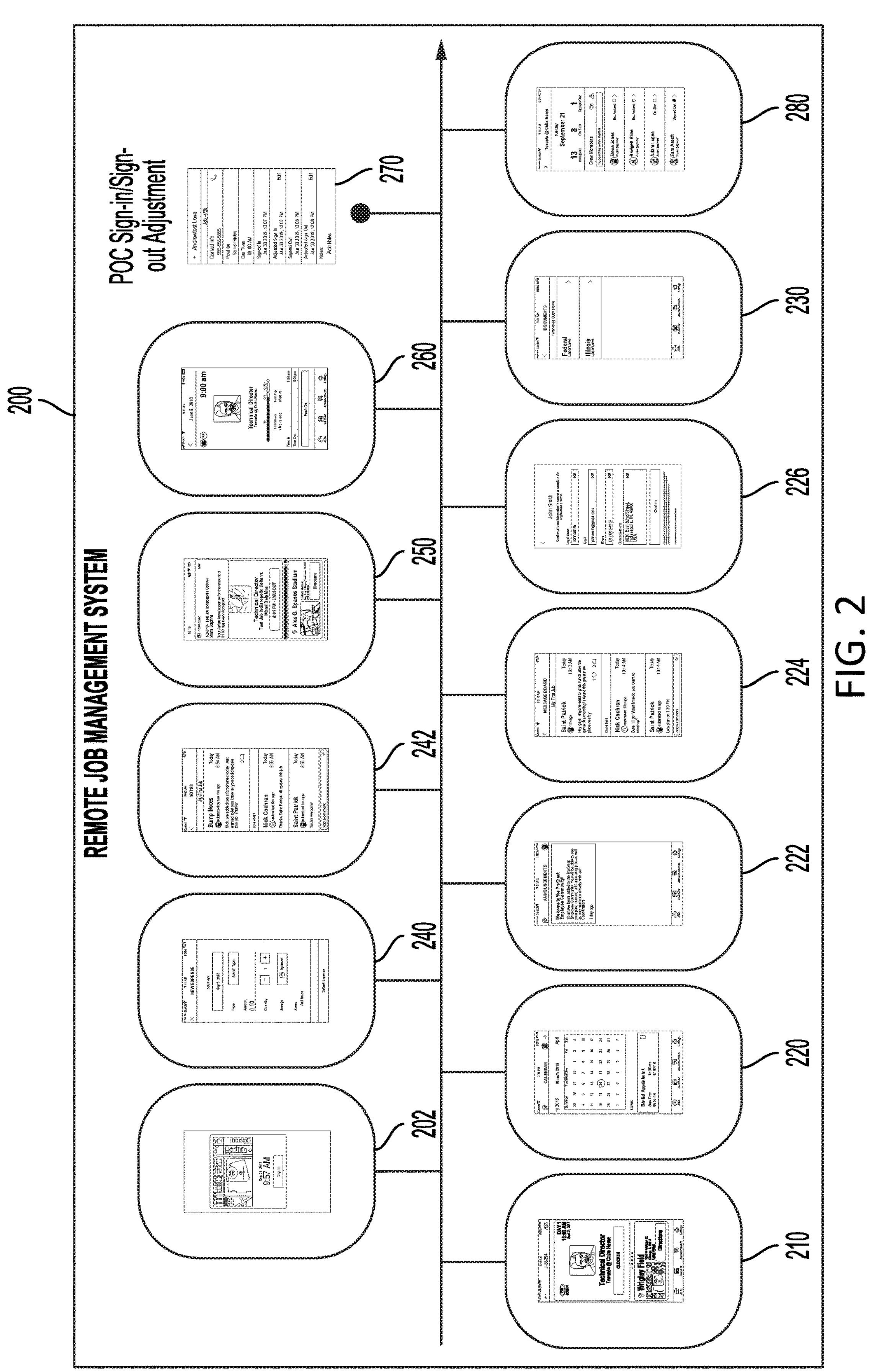
FIG. 2 is a block diagram further illustrating the remote employment management system of FIG. 1A, according to aspects of the present disclosure.

FIG. 2 is a block diagram further illustrating the remote employment management system 200 of FIG. 1A, according to aspects of the present disclosure. The remote employment management system 200 involves a comprehensive technology for enabling companies to manage staff on a daily basis without time clocks or paper based requests. In this configuration, the remote employment management system 200 includes a location-based clock in/out module 202, for example, as described with reference to FIGS. 1A-1C. One possible use for a geo-fenced remote clock-in/clock-out verification of the remote employment management system 200 is a film crew for a sporting event at a sporting stadium (e.g., Wrigley Field in Chicago, Illinois).

In one configuration, the remote employment management system 200 includes a job detail module 210 configured to provide employee access to job information, for example, as described with reference to FIGS. 5A-5B. In this configuration, the remote employment management system 200 also includes an event and personal calendar module 220, configured to quickly find jobs by date, as well as to create and manage personal events and add them to the calendar. The remote employment management system 200 further includes a company-wide announcements module 222 configured to send announcements to all employees, as well as push notification alerts of users for new announcements.

The remote employment management system 200 further includes a job related message board module 224. The job related message board module 224 is configured to provide crew members with direct access to the crew coordinator, including sending and receiving notes. The job related message board module 224 relies on push notification for alerting users of newly received notes. The job related message board module 224 enables the point-of-contact (POC) and crew managers to send notes directly from the mobile application to any member of the crew (e.g., a film crew at a sports venue). In addition, crew members can post and comment on job related and social activities using the job related message board module 224. In addition, push notifications alert users of new message board posts and comments.

Figure 4A:
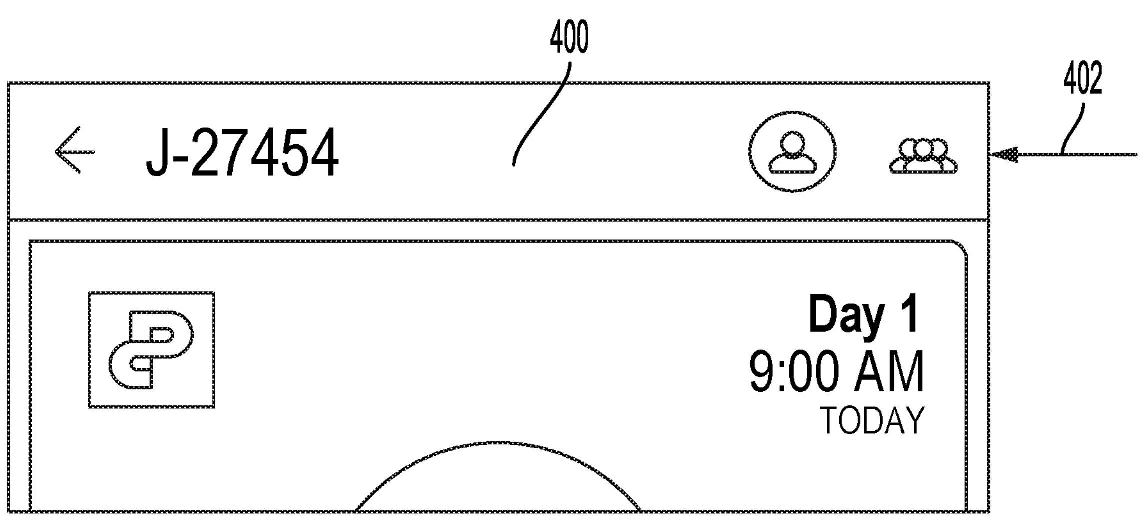
FIGS. 4A-4C are diagrams illustrating one implementation of the point-of-contact (POC) sign-in/sign-out adjustment module of the remote employment management system of FIG. 2, according to aspects of the present disclosure.
Figure 4B:
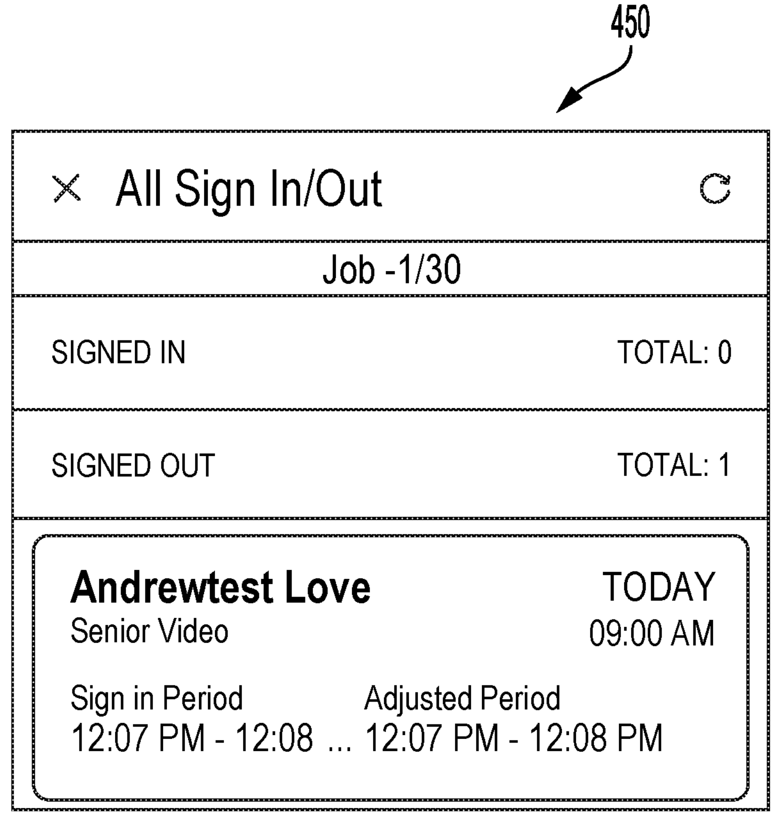
Figure 4C:
Figure 8:
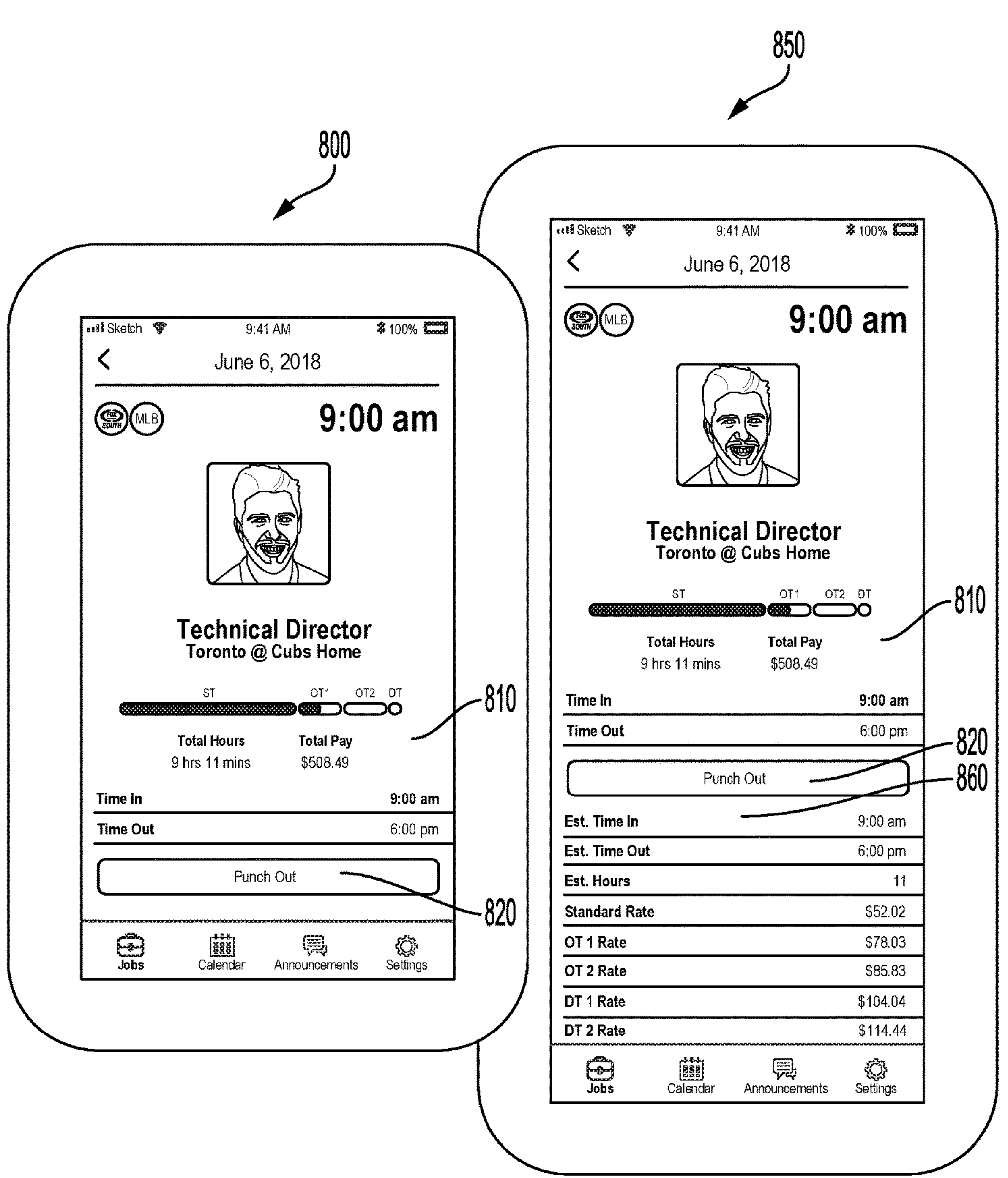
FIG. 8 illustrates one implementation of the detailed employee pay summary module of the remote employment management system of FIG. 2, configured to provide detailed pay information, according to aspects of the present disclosure.
Figure 9:
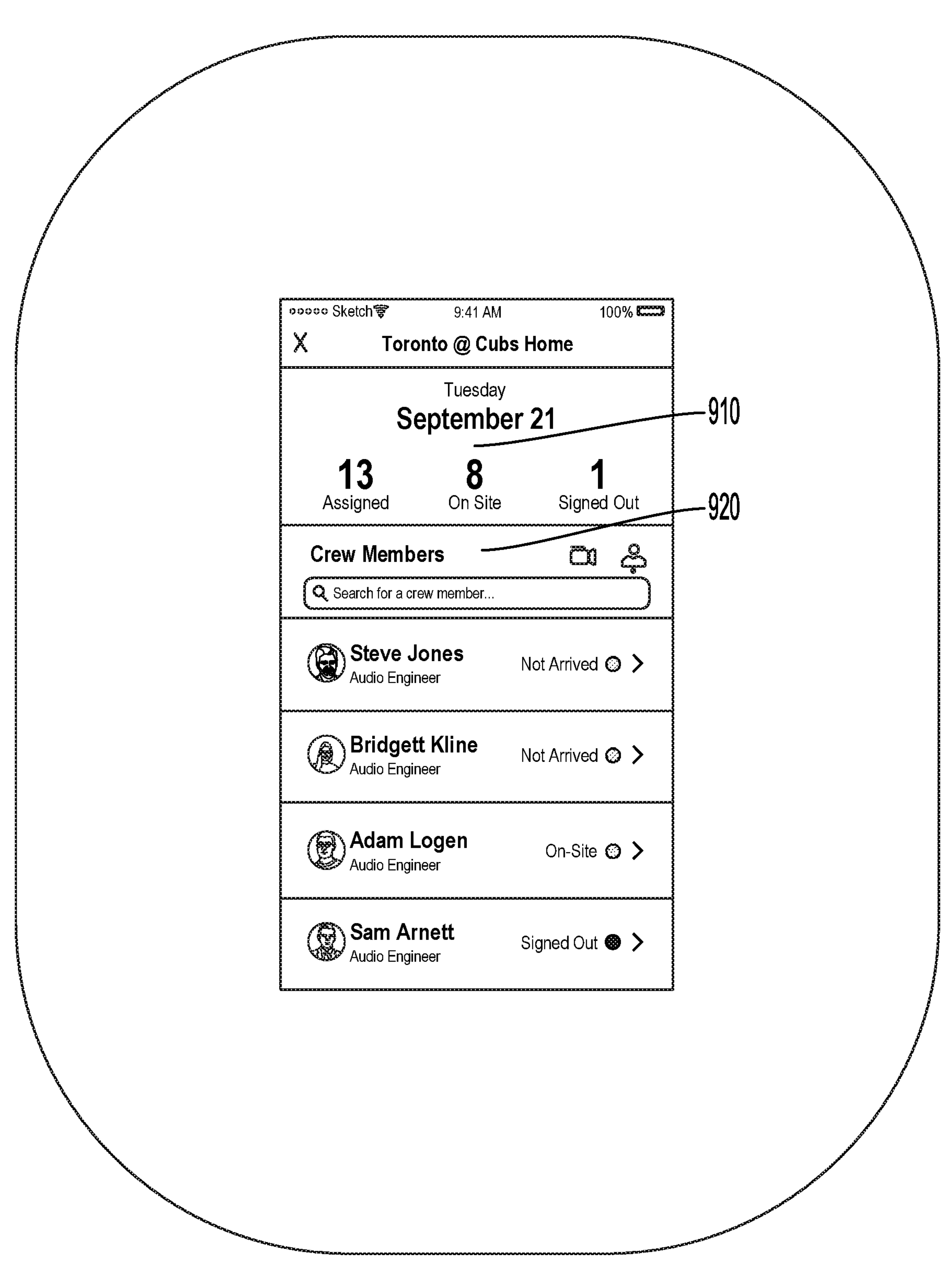
FIG. 9 illustrates one implementation of the on-site crew management module of the remote employment management system of FIG. 2, configured to provide detailed crew information, according to aspects of the present disclosure.

The remote employment management system 200 also includes an employee sign up and registration module 226 as well as a federal and state labor laws module 230, for example, as described with reference to FIG. 6. In addition, the remote employment management system 200 includes an expense submission and approval module 240, a direct communication with crew coordinator module 242, and a push notifications and direct links module 250, for example, as described in FIG. 7. The remote employment management system 200 also includes a detailed employee pay summary module 260, for example, as shown in FIG. 8. The remote employment management system 200 also includes a POC sign-in/sign-out adjustment module 270, for example, as shown in FIGS. 4A-4C, and an on-site crew management module 280, for example, as shown in FIG. 9.

The remote employment management system 200 may including an employment database configured to generate a clock-in/clock-out record for a remote employee of the remote employment management system 200 in response to the geo-fenced remote clock-in/clock-out verification of the mobile device of the remote employee. That is, the employment database configured to perform a login/logout of the remote employee into/from the remote employment management system when a current time is within a predetermined amount of time before or at a start time, or at or after an end time.

Figures 3A, 3B:
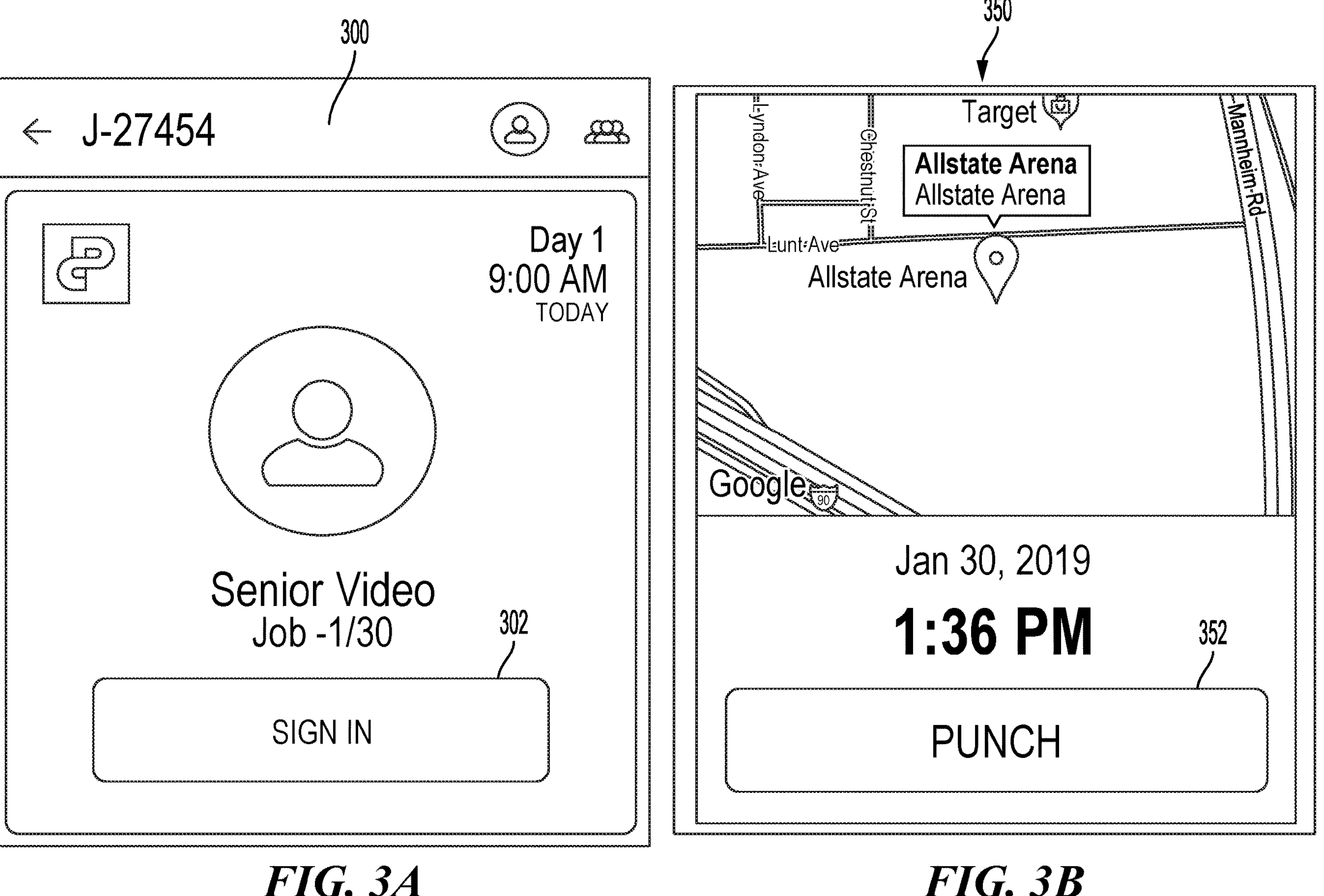
FIGS. 3A-3B are diagrams illustrating display screens for signing in and punching in for a remote job location of the remote employment management system, according to aspects of the present disclosure.

FIGS. 3A-3B are diagrams illustrating display screens for signing in and punching in for a remote job location of the remote employment management system 200, according to aspects of the present disclosure. FIG. 3A is a sign-in display screen 300 of a mobile device (e.g., 110) loaded with the remote employment management system 200, according to aspects of the present disclosure. In this example, the sign-in display screen 300 illustrates day one of a job (e.g., J-27454), in which an an employee operates as senior video for a film crew. In this example, the employee signs into the remote employment management system 200 by pressing a "SIGN IN" button 302. In this example, the user is allowed to sign into the remote employment management system 200 (e.g., at 9:00 AM) prior to reaching the remote job location, as shown in FIG. 3B.

FIG. 3B, is a punch-in display screen 350 of the mobile device (e.g., 110) loaded with the remote employment management system 200, according to aspects of the present disclosure. In this example, the remote job location is the Allstate Arena in Rosemont, Illinois According to aspects of the present disclosure, the remote employment management system 200 activates the "PUNCH" button 352 once the mobile device is within a predetermined geo-fenced clock-in/clock-out verification area of the remote job location. In this example, the employee is within the predetermined geo-fenced clock-in/clock-out verification area of the Allstate Arena at 1:36 PM. In response to pressing of the "PUNCH" button 352, the remote employment management system 200 verifies the geo-location of the mobile device is within the predetermined geo-fenced clock-in verification area of the Allstate Arena.

In this configuration, the remote employment management system 200 relies on geo-fenced remote clock-in/clock-out verification to verify that employees are on site and on time to sign in and out of a remote job location. This geo-fenced verification prevents fraud as well as inaccurate timesheets. In addition, the geo-fenced verification sign-in/sign-out process does not monitor an employee location. This process is triggered by the employee when the employee arrives at the remote job location, which is also triggered by the mobile device (e.g., 110). In response to pressing the "PUNCH" button 352, the mobile device (e.g., 110) of the employee transmits a current geo-location of the mobile device.

According to aspects of the present disclosure, a server application (e.g., the location server 160) applies a geo-fence location technology to verify the geo-location of the mobile device is within a geo-fenced clock-in/clock-out verification area of the remote job location. Once geo-fence location verification is complete and a current time is before or within a predetermined amount of time from a job start time, the employee is logged into the remote employment management system 200. This geo-fenced remote clock-in/clock-out verification eliminates manual time entry and excess paper use, which saves time and money. In addition, the remote employment management system 200 automatically updates a labor record (e.g., Salesforce Labor) with punch times of the remote employees.

Figure 3C:
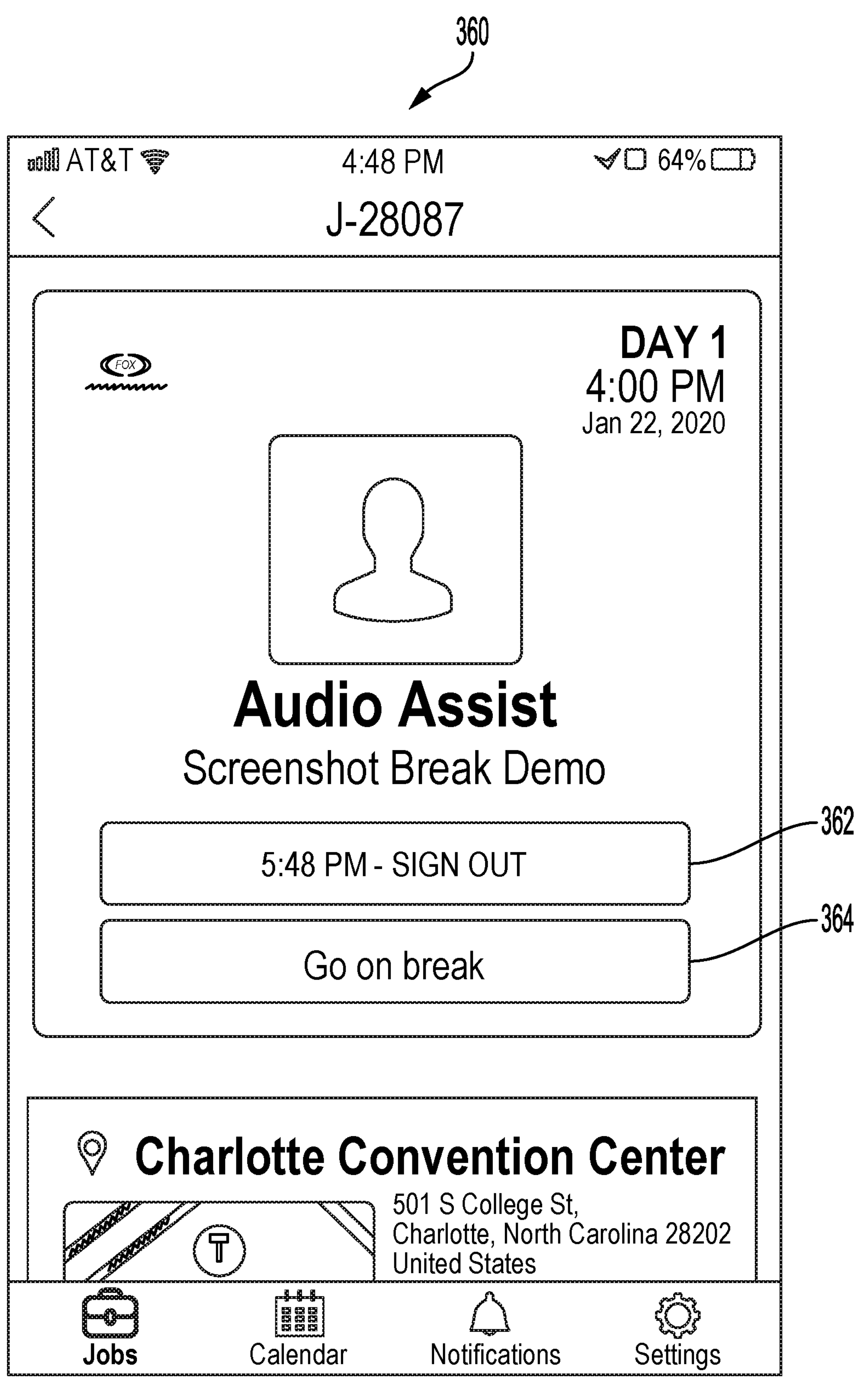
FIG. 3C is a break time function screen of the mobile device loaded with the remote employment management system, according to aspects of the present disclosure.

FIG. 3C is a break time function screen 360 of the mobile device (e.g., 110) loaded with the remote employment management system 200, according to aspects of the present disclosure. In this example, the remote job location is the Charlotte Convention Center in Charlotte, North Carolina, and the employee is an audio assistant. According to aspects of the present disclosure, if a coordinator of the employee has provided approval for an unpaid break, after sign-in, the "Go on Break" button 364 is activated on the break time function screen 360. The employee may record their break time using this function. In this example, starting a break will gray out the "SIGN-OUT" button 362 until the employee has ended his break. If the coordinator has not activated the break time function for the employee, the option is not available and the "Go on Break" button 364 is not available.

As shown in FIGS. 3A-3C, the geo-fence location verification process enables a scalable time entry based on automated rules. In order to sign in, the employee clicks on a job, then clicks on the "SIGN IN" button 302 of FIG. 3A. According to the geo-fence location verification process, an employee is within an allowed radius of a remote job location venue in order to punch in and out by pressing the "PUNCH" button 352 of FIG. 3B. That is, after the employee is within the allowed radius of the remote job location, the employee clicks on the "PUNCH" button 352 of FIG. 3B.

FIGS. 4A-4C are diagrams illustrating one implementation of the point-of-contact (POC) sign-in/sign-out adjustment module 270 of the remote employment management system 200, according to aspects of the present disclosure. In this aspect of the present disclosure, FIGS. 4A-4C are diagrams illustrating display screens for adjusting a sign in/out of employees working at a remote job location of the remote employment management system 200, according to aspects of the present disclosure. In the event that the employee forgot to punch in, the employee is instructed to punch in/out via a mobile application (APP) of the remote employment management system 200 so that there is a record, as shown in FIGS. 3A-3C. In addition, the employee is instructed to reach out to the POC to record the actual clock in/out times. If an employee is having trouble with punching via the APP of the remote employment management system 200, the employee is instructed to see the POC or contact their coordinator.

FIG. 4A is a job page display screen 400 of the mobile device (e.g., 110) loaded with a mobile application (APP) of the remote employment management system 200, according to aspects of the present disclosure. In this example, the job page display screen 400 illustrates day one of the job (e.g., J-27454). In this example, a point-of-contact (POC)/technology manager may view all sign ins/outs of the job by clicking on the people icon 402. Pressing the people icon 402 triggers an all sign in/out display screen 450, as shown in FIG. 4B.

In this example, the all sign in/out display screen 450 enables the POC/technology manager to view all employee sign ins/outs. The POC/technology manager begins an adjustment of the sign in/out of an employee by clicking on one of the entries of the all sign in/out display screen 450. This action triggers a record view display screen 470, as shown in FIG. 4C. As shown in FIG. 4C, the POC/technology manager adjusts the sign in of an employee by clicking on a sign in edit button 472. Similarly, the POC/technology manager adjusts the sign out of an employee by clicking on a sign out edit button 474.

In this configuration, the bottom of the record view display screen 470 includes a notes field 476. The notes field 476 enables the POC/technology manager to add any notes pertaining to the employee on the day in question. When complete, the POC/technology manager saves the record view display screen 470 to complete adjustment of the sign in/out of the employee. While adjustment of employee sign ins/outs is possible, it is preferred that the employee punch their own time. If an adjustment is made, the POC/technology manager is specified to update the notes field 476 with an explanation for the adjustment. The POC/technology manager may adjust the times for the employees but should only do so when it is determined that an employee's APP is not functioning properly or for special remote job locations that begin outside the venue.

Figures 5A, 5B:
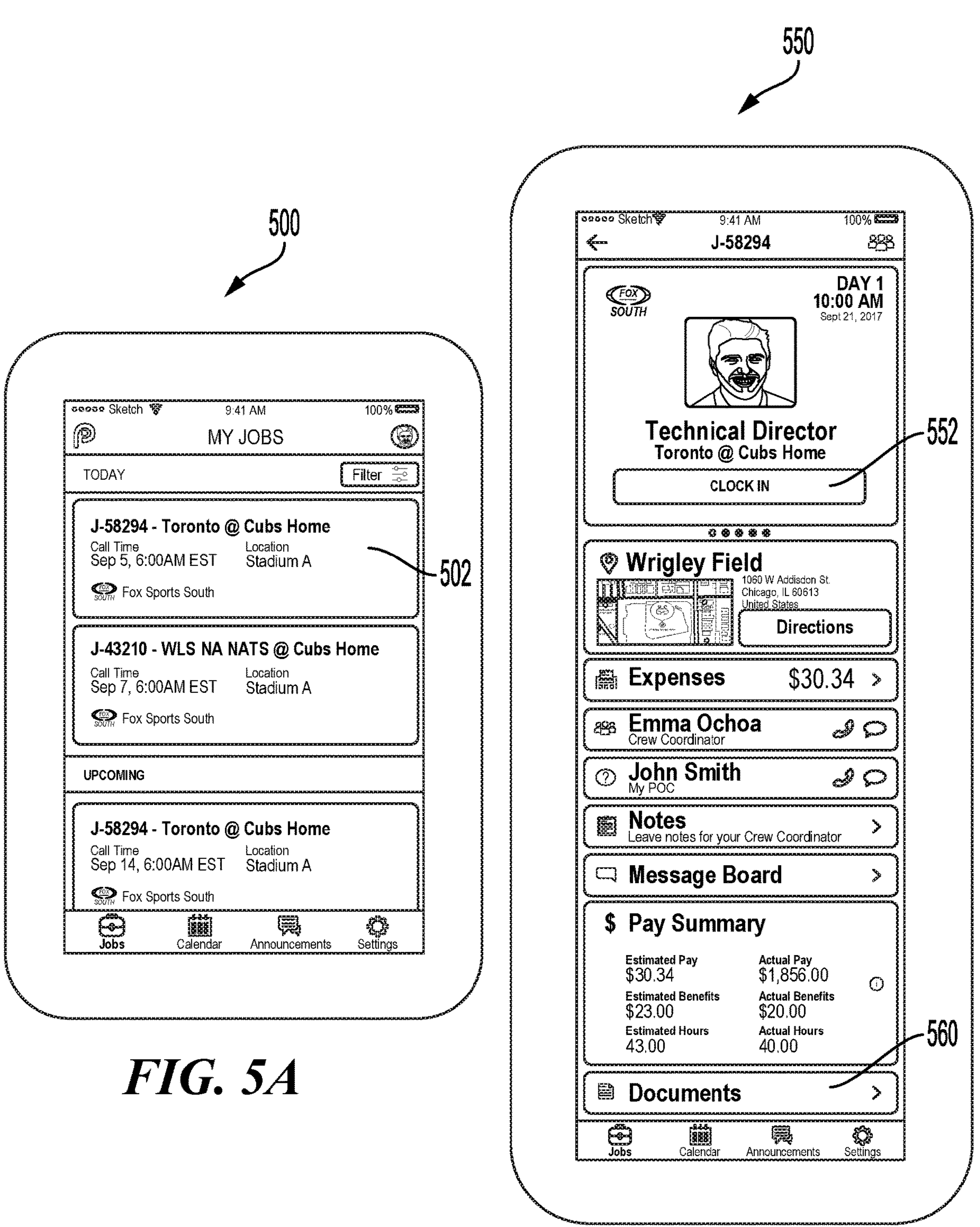
FIGS. 5A-5B further illustrate one implementation of the job detail module of the remote employment management system of FIG. 2, configured to provide employee access to job information according to aspects of the present disclosure.

FIGS. 5A-5B further illustrate one implementation of the job detail module 210 of the remote employment management system 200 configured to provide employee access to job information, according to aspects of the present disclosure. For example, FIG. 5A illustrates a job list screen 500, illustrating jobs for today, as well as upcoming jobs. In this example, the job 502 (e.g., J-58294) is a Major League Baseball (MLB) game between the Toronto Blue Jays and the Chicago Cubs at Wrigley Field. A job detail screen 550, shown in FIG. 5B, is triggered by clicking on a job 502 from the job list screen 500. In addition, the job list screen 500 includes the current remote location job 502, as well as upcoming remote location jobs.

FIG. 5B illustrates the job detail screen 550, which further illustrates directions for the remote job location, expenses incurred by the employee during work at the remote job location, a crew coordinator (e.g., Emma Ochoa), a point-of-contact (POC) (e.g., John Smith), notes, a message board, a pay summary, and a documents icon 560 (e.g., labor law document access). Although described with regards to an MLB game, the remote employment management system 200 provides an end-to-end time and expense management system for other remote job locations. For example, the remote employment management system 200 may be used to manage a construction crew, in which a construction site is the remote job location. The end-to-end time and expense management system provided by the remote employment management system 200, as described in the present disclosure, is not limited to the examples provided and may support any remote job location.

Figure 6:
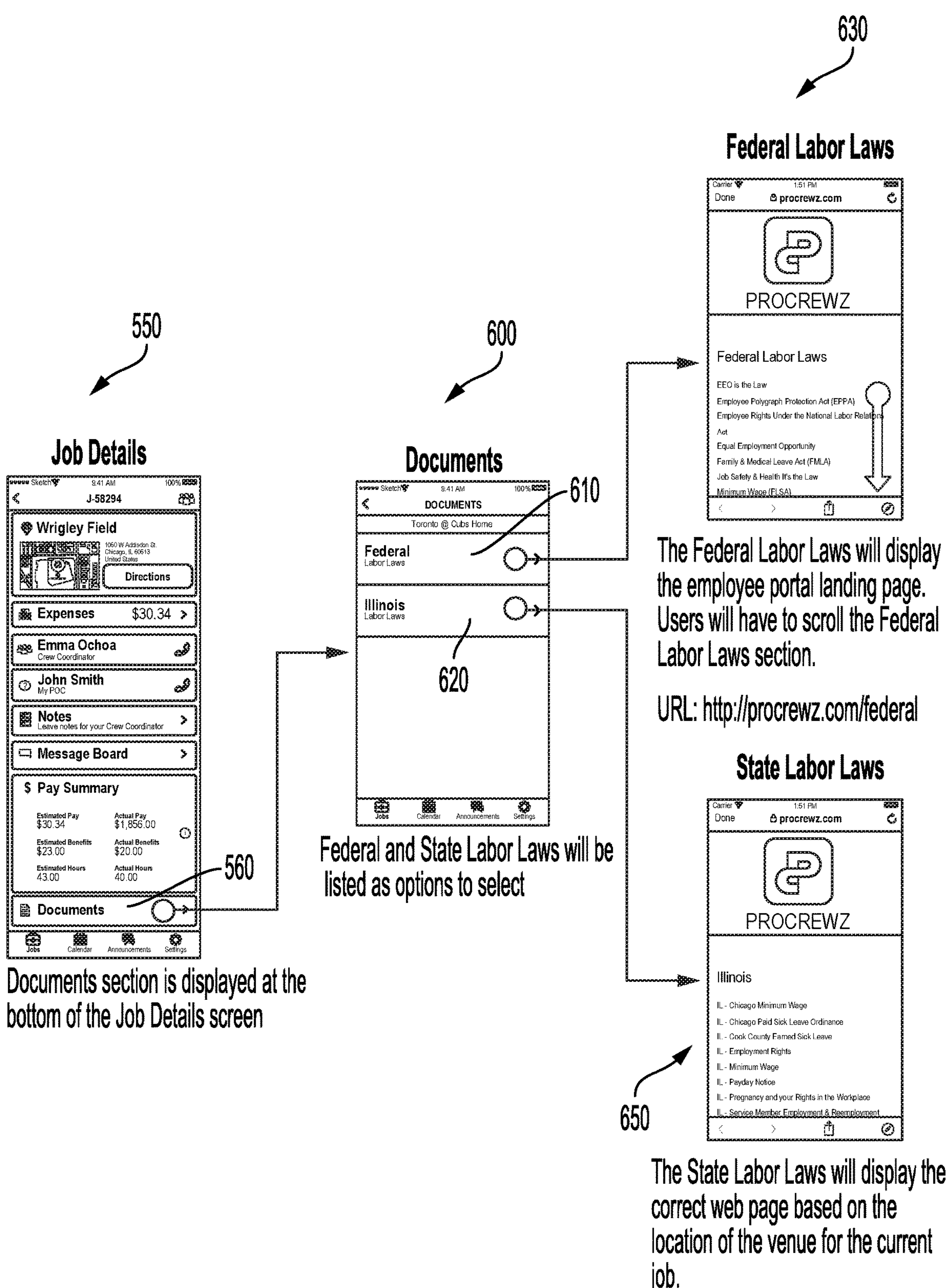
FIG. 6 illustrates one implementation of the federal and state labor laws modules of the remote employment management system of FIG. 2, configured to access and display federal and state labor laws based on a venue location, according to aspects of the present disclosure.

FIG. 6 illustrates one implementation of the federal and state labor laws module 230 of the remote employment management system 200 configured to access and display federal and state labor laws based on a venue location, according to aspects of the present disclosure. In one aspect of the present disclosure, clock-in of the employee (see FIGS. 3A-3C) may trigger the remote employment management system 200 to access federal and state employment laws based on the remote job location. In this example, the user clicks on the documents icon 560 in the job detail screen 550 to trigger a documents screen 600. From the documents screen 600, the employee may click on a federal labor laws icon 610 or a state labor laws icon 620 (e.g., Illinois). The federal labor laws icon 610 triggers a display of a federal labor laws screen 630, and the state labor laws icon 620 triggers display of a state labor laws screen 650 for Illinois. In an alternative configuration, a job location may be outside the predetermined geo-fenced clock-in verification area, such as a nearby location.

Figure 7:
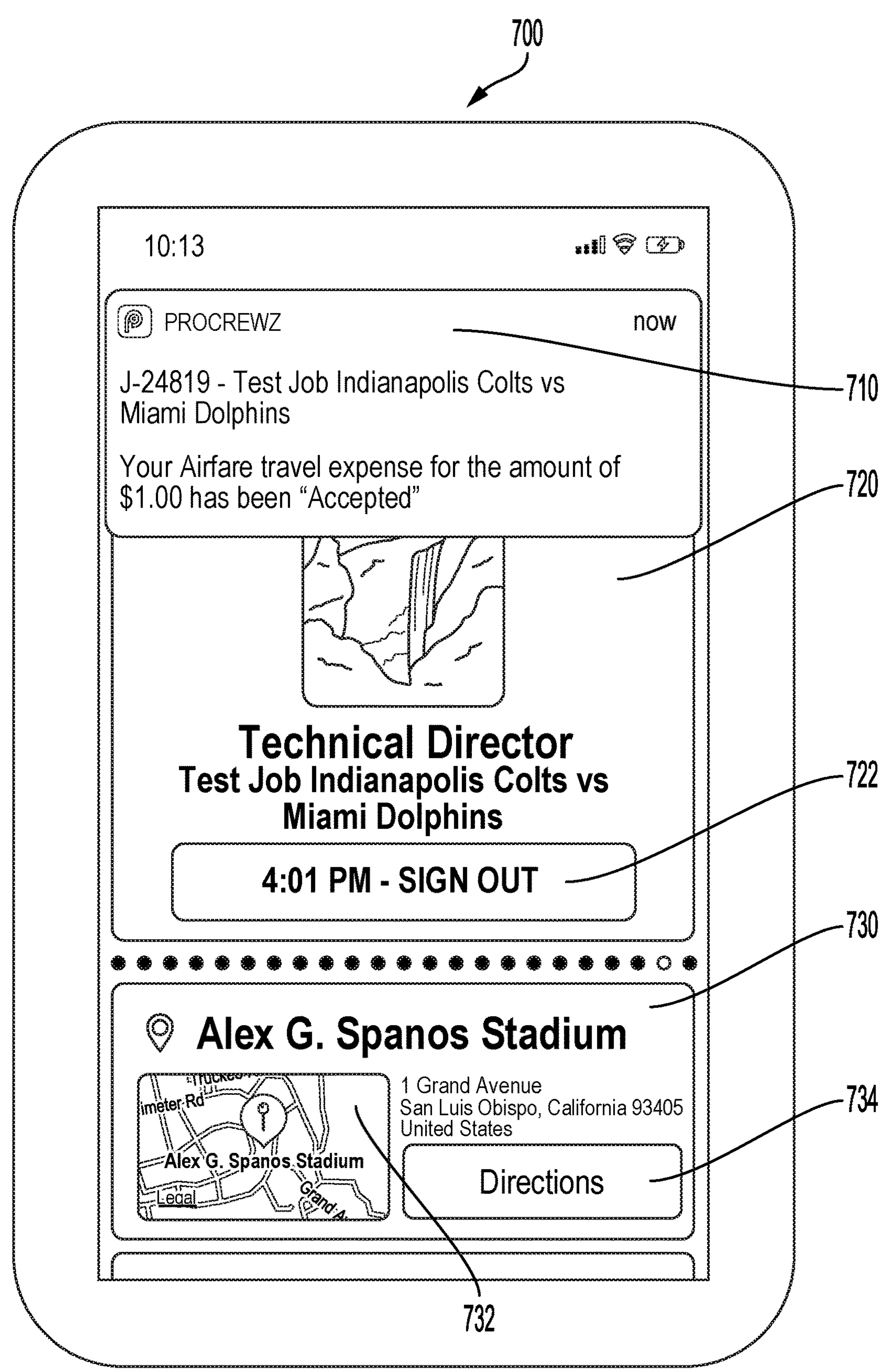
FIG. 7 illustrates one implementation of the push notifications and direct links module of the remote employment management system of FIG. 2, configured to enable crew communication, according to aspects of the present disclosure.

FIG. 7 illustrates one implementation of the push notifications and direct links module 250 of the remote employment management system 200 configured to enable crew communication, according to aspects of the present disclosure. In this example, a job detail screen 700 is shown, including a notifications portion 710, a job information portion 720, and a job location portion 730. In this example, the notifications portion 710 indicates a current job (e.g., J-24819) as a technical director for a film crew of a National Football League (NFL) game between the Indianapolis Colts and the Miami Dolphins. The notifications portion 710 also indicates acceptance for an air travel expense reimbursement.

In his example, the job information portion 720 includes the noted job information, as well as a "SIGN OUT" button 722. The job location portion 730 provides a map 732 as well as a "Directions" button 734. The "SIGN OUT" button 722 triggers reporting a logout geo-location of the mobile device (e.g., 110) to the location server 160 of the remote employment management system 200 to request clock-out, as shown in FIGS. 1A-1C. Requesting clock-out is conditioned on the logout geo-location being within a geo-fenced clock-in/clock-out verification area of the remote job location (e.g., Alex G. Spanos Stadium).

FIG. 8 illustrates one implementation of the detailed employee pay summary module 260 of the remote employment management system 200 configured to provide detailed pay information, according to aspects of the present disclosure. In this example, a job detail screen 800, including a job information portion, including an estimated pay section 810, and a "Punch Out" button 820. In this example, a pay summary screen 850 is triggered by pressing the estimated pay section 810. The pay summary screen 850 includes a detailed pay summary portion 860, as well as the estimated pay section 810 and a "Punch Out" button 820. In this example, the employee is a technical director for a film crew of an MLB game between the Toronto Blue Jays at the Chicago Cubs, with an estimated pay of $508.49 at a first over time (OT 1 Rate). The employee's standard rate, overtime rates (OT 1 Rate, OT 2 Rate), and double time rates (DT 1 Rate, DT 2 Rate) are also shown.

FIG. 9 illustrates one implementation of the on-site crew management module 280 of the remote employment management system 200 configured to provide detailed crew information for a remote job location, according to aspects of the present disclosure. In this example, a crew management screen 900, a crew summary section 910 and a crew details section 920 are shown. For example, the crew management screen 900 includes crew member information for a film crew of an MLB game between the Toronto Blue Jays at the Chicago Cubs.

In aspects of the present disclosure, the crew management screen 900 enables an on-site point-of-contact (POC)/technology manager with control over the entire film crew. The remote employment management system 200 provides a mobile application for supporting the POC/technology manager in managing remote jobs using the crew management screen 900 as an essential tool used on-site. In aspects of the present disclosure, the remote employment management system 200 provides the POC/technology manager with a notification when employees sign in or out, as indicated by the crew summary section 910. The crew management screen 900 allows a POC/technology manager to access all jobs they are assigned to without having to create a labor record on that job. In addition, a POC/technology manager is assigned by day of each remote job. In one configuration, the crew management screen 900 allows viewing of a sign-in/sign-out record of a crew of the remote job location. In this configuration, crew management screen 900 enables the POC of the remote job location to adjust a sign-in/sign-out time of a crew member.

Figure 10:
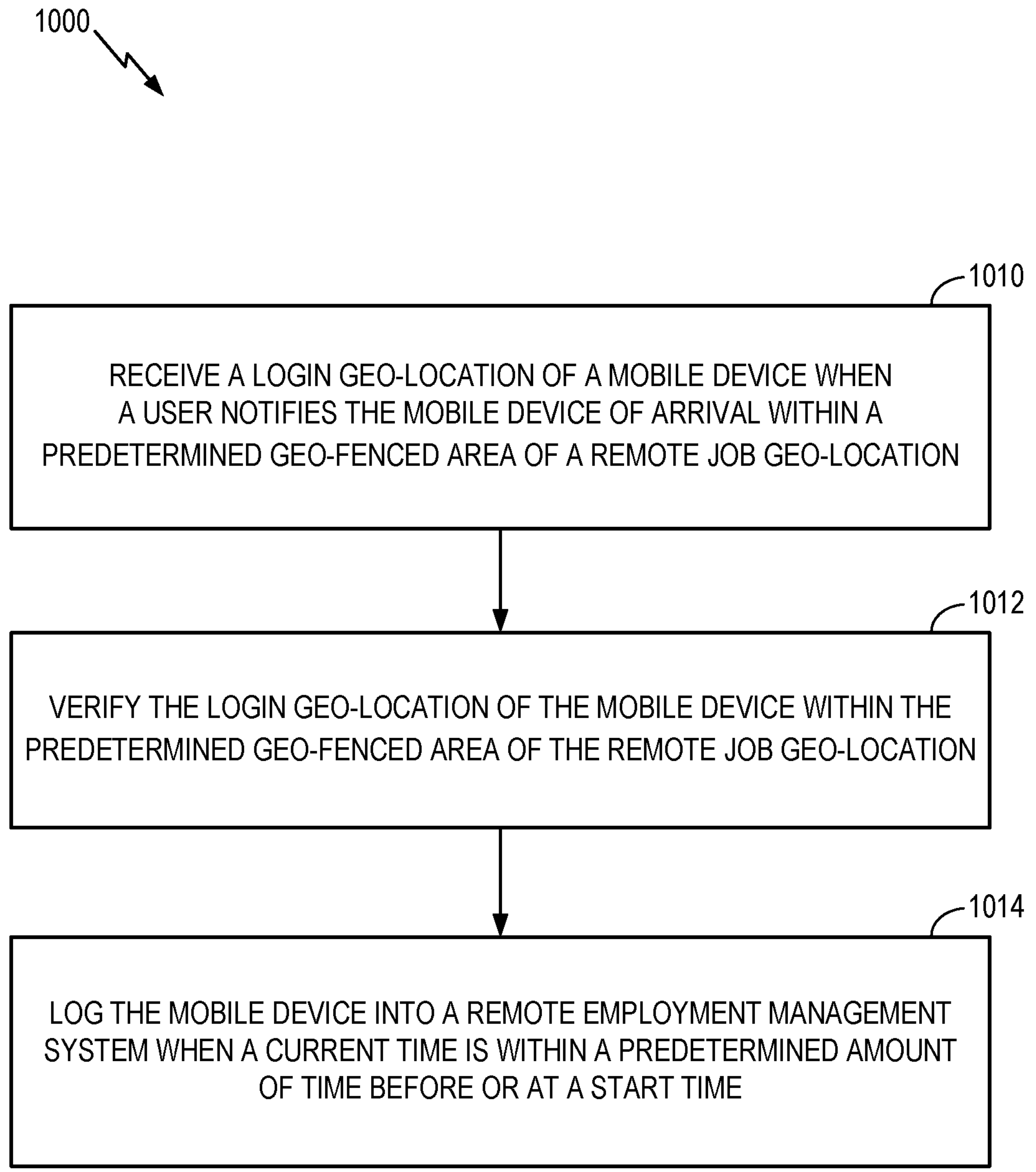
FIG. 10 illustrates a method for geo-fenced remote clock-in/clock-out verification of the remote employment management system of FIG. 2, according to aspects of the present disclosure.

FIG. 10 illustrates a method for geo-fenced remote clock-in/clock-out verification of a remote employment management system according to aspects of the present disclosure. A method 1000 of verifying the login geo-location of a mobile device begins at block 1010. At block 1010, a login geo-location of a mobile device is received when a user (e.g., a remote employee) notifies the mobile device of arrival within a predetermined geo-fenced area of a remote job geo-location. For example, as shown in FIG. 3B, the geo-fence location verification process specifies that an employee is within an allowed radius of a remote job location venue in order to punch in and out by pressing the "PUNCH" button 352 of punch-in display screen 350.

According to aspects of the present disclosure, after the employee is within the allowed radius of the remote job location, the employee clicks on the "PUNCH" button 352 of the punch-in display screen 350. As shown in FIGS. 3A and 3B, the punch-in display screen 350 displays a remote job location (e.g., Allstate Arena), a current time, and a date. The sign-in display screen 300 displays a "SIGN IN" button 302; however, the punch-in display screen 350 is provided to trigger the mobile device 110 to report the login geo-location of the mobile device 110 to the location server 160.

At block 1012, the login geo-location of the mobile device is verified as being within the predetermined geo-fenced area of the remote job location. For example, as shown in FIG. 3B, a predetermined geo-fenced area is established to surround a remote job location (e.g., Allstate Arena) according to, for example, longitudinal and latitudinal positions. In this configuration, the location server 160 may convert the received login geo-location of the mobile device 110 into a longitudinal and a latitudinal position, as shown in FIG. 1A. The login geo-location is verified when the longitudinal and the latitudinal positions of the mobile device 110 fall within the longitudinal and latitudinal positions of the predetermined geo-fenced area of the remote job location. Otherwise, the "PUNCH" request is rejected by the location server 160. As a result, the user of the mobile device 110 is prevented from punching in until arriving at the remote job location.

At block 1014, the mobile device is logged into a remote employment management system when a current time is within a predetermined amount of time before or at a start time. For example, the mobile device is within the predetermined geo-fenced area of Allstate Arena, and the current time (e.g., 1:36 PM) is a predetermined amount of time (e.g., 5 minutes) before or at a start time (e.g., 1:40 PM), as shown in FIG. 3B. Consequently, the user (e.g., employee) of the mobile device 110 is clocked-in to the remote employment management system 200, as shown in FIG. 2. In one aspect of the present disclosure, the location server 160 may be incorporated into the remote employment management system 200.

The remote employment management system 200 may also receive a logout geo-location of the mobile device 110 when the user notifies the mobile device of clock-out within the predetermined geo-fenced area of the remote job geo-location. For example, as shown in FIG. 7, pressing of the "SIGN OUT" button 722 triggers reporting of the logout geo-location of the mobile device 110 to the remote employment management system 200 (e.g., the location server 160) to request clock-out in response to the sign out request. In response, the logout geo-location of the mobile device 110 is verified as being within the predetermined geo-fenced area of the remote job geo-location.

For example, requesting a clock-out by pressing the "SIGN OUT" button 722 is conditioned on the logout geo-location being within a geo-fenced clock-in/clock-out verification area of the remote job location (e.g., Alex G. Spanos Stadium). Assuming the logout geo-location is verified, the user is logged out of the remote employment management system 200 when the current time is within a predetermined amount of time after (e.g., 5 minutes) or at an end time. In the example shown in FIG. 7, the end time is 4:00 PM and the current time is 4:01 PM. In this configuration, the location server 160 also confirms a logout geo-location when the longitudinal position and the latitudinal position of the logout geo-location are within the longitudinal and latitudinal positions of the predetermined geo-fenced area of the remote job location.

Figure 11:
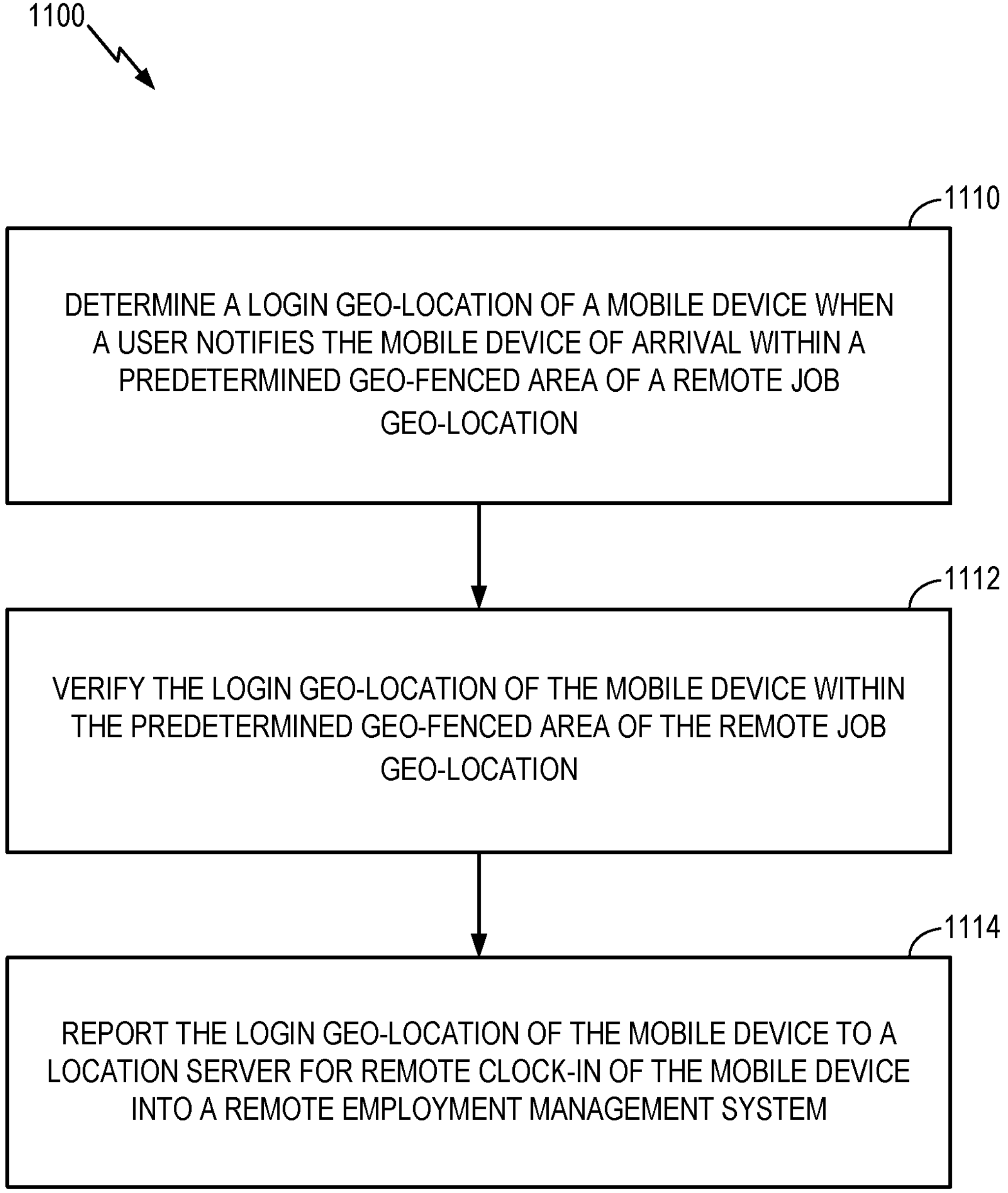
FIG. 11 illustrates a method of reporting a login geo-location for geo-fenced remote clock-in/clock-out verification of the remote employment management system of FIG. 2, according to aspects of the present disclosure.

FIG. 11 illustrates a method of reporting a login geo-location for geo-fenced remote clock-in/clock-out verification of a remote employment management system, according to aspects of the present disclosure. A method 1100 of reporting a login geo-location for geo-fenced remote clock-in/clock-out verification of a remote employment management system begins at block 1110. At block 1110, a login geo-location of a mobile device is determined when a user notifies the mobile device of arrival within a predetermined geo-fenced area of a remote job geo-location. For example, as shown in FIG. 5B, the mobile device displays the job detail screen 550, indicating the remote job location (e.g., Wrigley Field), the current time, and the date. The job detail screen 550 also displays the "CLOCK IN" button 552 to trigger the mobile device 110 to report the login geo-location of the mobile device 110 to the location server 160, as shown in FIGS. 1A-1C.

At block 1112, the login geo-location of the mobile device is verified as being within the predetermined geo-fenced area of the remote job geo-location by the mobile device. For example, as shown in FIG. 1B, the mobile device 110 may convert the login geo-location of the mobile device 110 into a longitudinal position and a latitudinal position. The login geo-location is verified when the longitudinal position and the latitudinal position of the login geo-location fall within the longitudinal and latitudinal positions of the predetermined geo-fenced area of the remote job location. Otherwise, the "SIGN IN" request is rejected by the mobile device 110. As a result, the user of the mobile device 110 is prevented from signing in until arriving at the remote job location.

Although longitudinal and latitudinal positions of the login geo-location being within the predetermined geo-fenced area of the remote job location are described, other methods of verification are possible. For example, the user of the mobile device 110 may take a photograph upon arrival at the remote job location. This photograph may be taken of a particular location within the parking lot of the remote job location. For example, the user may take a photograph of a parking location section to verify arrival at the remote job location. This photograph may be used in place of a login geo-location of the user to eliminate tracking of the user's location. Otherwise, tracking of the mobile device 110 is limited to providing the login geo-location to the location server 160. This alternative process may be helpful when a remote job location is initially outside of a venue, such as a fan location (e.g., public space or establishment nearby).

At block 1114, the login geo-location of the mobile device is reported to a location server to request remote clock-in of the user into the remote employment management system. In this example, the user is logged into the remote employment management system 200 when the current time is within a predetermined amount of time before or at a start time. The user (e.g., employee) of the mobile device 110 is clocked-in to the remote employment management system 200 by generating a clock-in/clock-out record to determine working hours for the employee. The method also includes viewing, by a point-of-contact of the remote job location, a sign-in/sign-out record of a crew of the remote job location, and adjusting a sign-in/sign-out time of a crew member. For example, as shown in FIG. 9, the crew management screen 900 allows viewing of a sign-in/sign-out record of a crew of the remote job location. In this configuration, the crew management screen 900 enables the POC of the remote job location to adjust a sign-in/sign-out time of a crew member. In one configuration, the adjusting of the sign-in/sign-out record of the crew member is performed when a sign-in/sign-out operation failure is detected.

In one aspect of the present disclosure, the mobile device 110 may report alternative location data (e.g., a photograph) in lieu of (or to supplement) the login geo-location sent to the location server 160. The method 1100 also includes displaying, by the mobile device, federal and state employment laws based on the remote job location in response to the clock-in of the user into the remote employment management system, for example, as shown in FIG. 6.

One possible use is the remote management of a film crew for a Major League Baseball (MLB) game. As shown in FIG. 2, the remote employment management system enables: (1) creation and management of work rules; (2) scheduling work times; (3) position assignments; (5) assignment schedule request and acceptance; (6) individual schedule/calendar synchronization with user unavailable for work date block (see event and personal calendar module 220); (7) schedule updates or cancellation; and (8) elimination of a time clock. For example, an employee check-in for a remote job location is conditioned on a geo-location of a user device and a geo-fenced area associated with the remote job location (e.g., a stadium) and the current time. In addition, employee check-out from work is conditioned on a geo-location of a user device and a geo-fenced area associated with a remote job location (e.g., a stadium) and the current time, as described in FIGS. 4A and 4B.

Aspects of the remote employment management system 200 provide an end-to-end employee time and expense management system, including: (9) employee profile creation and update including credential integration and photo (see FIGS. 5A and 5B); (10) employee messaging specific to job or assignment (see FIG. 7); (11) specific employee communication and oversight functionality for job foreman/manager/point-of-contact (POC), as shown in FIG. 9; (12) expense submission and approval, including e-receipt submission (see expense submission and approval module 240); (13) travel request and approval; (14) travel pay request, including rules definition and auto flight time updates and flight status updates and drive time estimates; (15) review staff on a crew or job by name, position, check-in/out status; (16) integration with 3rd party job/project creation systems for assignments, resource management, payroll, expense reimbursement, travel approval; (17) government specified notices and posters (see FIG. 6); (18) documents including tech books and other job related documents; (19) crew call updates; and (20) company announcements to employees.

The disclosure may be implemented in conjunction with Wi-Fi/wireless local area network (WLAN) or other wireless networks. In addition to Wi-Fi/WLAN signals, a wireless/mobile station may also receive signals from satellites, which may be from a global positioning system (GPS), Galileo, GLONASS, NAVSTAR, QZSS, a system that uses satellites from a combination of these systems, or any satellite positioning system developed in the future, each referred to generally herein as a satellite positioning system (SPS) or global navigation satellite system (GNSS). The disclosure may also be implemented in conjunction with pseudolites or a combination of systems that includes pseudolites. The disclosure may also be implemented in conjunction with femtocells or a combination of systems that includes femtocells.

Position determination techniques described herein may be implemented in conjunction with various wireless communications networks, such as a wireless wide area network (WWAN), a WLAN, a wireless personal area network (WPAN), and so on. The term "network" and "system" are often used interchangeably. A WWAN may be a code division multiple access (CDMA) network, a time division multiple access (TDMA) network, a frequency division multiple access (FDMA) network, an orthogonal frequency division multiple access (OFDMA) network, a single-carrier frequency division multiple access (SC-FDMA) network, a long term evolution (LTE) network, a WiMAX (IEEE 802.16) network, and so on. A CDMA network may implement one or more radio access technologies (RATs) such as CDMA2000, wideband-CDMA (W-CDMA), and so on. CDMA2000 includes IS-95, IS-2000, and IS-856 standards. A TDMA network may implement global system for mobile communications (GSM), digital advanced mobile phone system (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN, and/or WPAN.

Although the preceding description was primarily with respect to GPS, the method and apparatus described herein may be used with various global satellite positioning systems (SPS). A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs).

For example, an SV in a constellation of a global navigation satellite system (GNSS), such as global positioning system (GPS), Galileo, Glonass or Compass, may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., a satellite based augmentation system (SBAS)) that may be associated with or otherwise enabled for use with one or more global and/or regional navigation satellite systems.

By way of example but not limitation, an SBAS may include an augmentation system(s) that provides integrity information, differential corrections, etc., such as, e.g., a wide area augmentation system (WAAS), European Geostationary Navigation Overlay Service (EGNOS), multi-functional satellite augmentation system (MSAS), GPS aided geo augmented navigation or GPS and Geo augmented navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The methodologies may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where signals from an orbiting satellite may be unavailable, such as in tunnels, mines, buildings, urban canyons or other enclosed areas. Another implementation of pseudolites is known as radio-beacons. The term "satellite," as used herein, is intended to include pseudolites, equivalents of pseudolites, and possibly others. The term "SPS signals," as used herein, is intended to include SPS-like signals from pseudolites or equivalents of pseudolites.

As described herein, a mobile device refers to a device, such as a cellular or other wireless communications device, personal communication systems (PCS) device, personal navigation device (PND), personal information manager (PIM), personal digital assistant (PDA), laptop, tablet, or other suitable mobile station device that is capable of receiving wireless communications and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communications devices, computers, laptops, etc., which are capable of communications with a server, such as via the Internet, Wi-Fi, or other networks, and regardless of whether satellite signal reception, assistance reception, and/or position-related processing occurs at the device, at a server, or at another device associated with the network. Any operable combination of the above are also considered a "mobile device."

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer. Disk and disc, as used herein, include compact disc (CD), laser disc, optical disc, digital versatile disc (DVD), floppy disk, and Bluray® disc, where disks usually reproduce data magnetically, while discs reproduce data optically with lasers. Combinations of the above should also be included within the scope of computer-readable media.

The various illustrative logical blocks, modules, and circuits described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims, although the communications apparatus may not store all of the instructions and/or data on a computer-readable medium.

Although the present disclosure and its advantages have been described in detail, it should be understood that various changes, substitutions, and alterations can be made herein without departing from the technology of the present disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, and composition of matter, means, methods, and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

What is claimed is:

1. A method for geo-fenced remote clock-in/clock-out verification of a remote employment management system, comprising:

providing remote access, over a network to a mobile device of a remote employee, to a user interface for accessing the remote employment management system;

receiving initial position data, corresponding to an initial remote job location, captured by the mobile device, wherein the initial remote job location is assigned to the remote employee and associated with a primary remote job location for the remote employee;

determining that the initial position data, of the initial remote job location, is outside a geo-fenced area of the primary remote job location, wherein a log-in user interface element of the user interface is deactivated based on the initial position data being outside the geo-fenced area of the primary remote job location;

based on the determining that the initial position data is outside the geo-fenced area of the primary remote job location, receiving alternate location data including one or more photographs captured by a camera of the mobile device;

verifying the alternate location data captured by the remote employee matches the initial remote job location assigned to the remote employee using the one or more photographs;

receiving subsequent position data captured by a global positioning system (GPS) of the mobile device;

determining that the subsequent position data is within the geo-fenced area of the primary remote job location, wherein the log-in user interface element of the user interface is activated based on the subsequent position data being within the geo-fenced area of the primary remote job location;

receiving, via the activated log-in user interface element of the user interface, a login request from the mobile device when the mobile device is within the geo-fenced area of the primary remote job location assigned to the remote employee;

based on the received login request, logging the mobile device of the remote employee into the remote employment management system, wherein logging the mobile device into the remote employment management system generates a clock-in/clock-out record for the remote employee, the clock-in/clock-out record including a clock-in time at which the login request is received;

generating a pay summary module for the user interface, the pay summary module estimating pay for the remote employee based on a pay rate for the remote employee and the clock-in time;

adjusting the clock-in time, of the clock-in record, to correspond to a time of verification of the alternate location data matching the initial remote job location based on the one or more photographs; and automatically updating the pay summary module of the user interface with an adjusted estimated pay for the remote employee, when the clock-in time is adjusted, based on the pay rate for the remote employee and the adjusted clock-in time.

2. The method of claim 1, further comprising:

receiving a logout geo-location of the mobile device when the remote employee notifies the mobile device of clock-out within the geo-fenced area of the remote job location;

verifying the logout geo-location of the mobile device within the geo-fenced area of the remote job location; and logging the remote employee out of the remote employment management system when the current time is within the predetermined amount of time after or at an end time.

3. The method of claim 1, further comprising displaying, by the mobile device, federal and state employment laws based on the remote job location in response to the logging of the mobile device of the remote employee into the remote employment management system.

4. The method of claim 1, in which determining that the subsequent position data is within the geo-fenced area of the primary remote job location further comprises:

converting the received subsequent position data of the mobile device into a longitudinal position and a latitudinal position;

comparing the longitudinal position and the latitudinal position of the login geo-location subsequent position data to longitudinal and latitudinal positions of the geo-fenced area of the remote job location; and determining that the subsequent position data is within the geo-fenced area when the longitudinal position and the latitudinal position of the subsequent position data is within the longitudinal and latitudinal positions of the geo-fenced area of the remote job location.

5. A method of reporting a login geo-location for geo-fenced remote clock-in/clock-out verification of a remote employment management system, comprising:

providing remote access, over a network to a mobile device of a remote employee, to a user interface for accessing the remote employment management system;

receiving initial position data, corresponding to an initial remote job location, captured by a global positioning system (GPS) of the mobile device, wherein the initial remote job location is assigned to the remote employee and associated with a primary remote job location for the remote employee;

determining that the initial position data, of the initial remote job location, is outside a geo-fenced area of the primary remote job location assigned to the remote employee, wherein a log-in user interface element of the user interface is deactivated based on the initial position data being outside the geo-fenced area of the primary remote job location;

based on the determining that the alternate location data is outside the geo-fenced area of the primary remote job location, receiving alternate location data including one or more photographs captured by a camera of the mobile device;

verifying the alternate location data captured by the remote employee matches the initial remote job location assigned to the remote employee using the one or more photographs;

receiving subsequent position data captured by the GPS of the mobile device;

determining that the subsequent position data is within the geo-fenced area of the primary remote job location, wherein the log-in user interface element of the user interface is activated based on the subsequent position data being within the geo-fenced area of the primary remote job location;

receiving, via the activated log-in user interface element of the user interface, a login request from the mobile device when the mobile device is within the geo-fenced area of the primary remote job location venue assigned to the remote employee;

based on the received log-in request, reporting the subsequent position data to a location server to request remote clock-in of the remote employee into the remote employment management system, wherein logging the mobile device into the remote employment management system generates a clock-in/clock-out record for the remote employee, the clock-in/clock-out record including a clock-in time at which the login request is received;

generating a pay summary module for the user interface, the pay summary module estimating pay for the remote employee based on a pay rate for the remote employee and the clock-in time;

adjusting the clock-in time, of the clock-in record, to correspond to a time of verification of the alternate location data matching the initial remote job location based on the one or more photographs; and automatically updating the pay summary module of the user interface with an adjusted estimated pay for the remote employee, when the clock-in time is adjusted, based on the pay rate for the remote employee and the adjusted clock-in time.

6. The method of claim 5, further comprising:

determining a logout geo-location of the mobile device when the remote employee notifies the mobile device of a sign out request within the geo-fenced area of the remote job location assigned to the remote employee;

verifying the logout geo-location of the mobile device within the geo-fenced area of the remote job location assigned to the remote employee; and reporting the logout geo-location of the mobile device to the location server to request remote clock-out of the remote employee from the remote employment management system.

7. The method of claim 5, further comprising:

displaying, by the mobile device, federal and state employment laws based on the remote job location in response to the remote clock-in of the remote employee into the remote employment management system.

8. The method of claim 5, in which determining that the subsequent position data is within the geo-fenced area of the primary remote job location further comprises:

converting the received subsequent position data of the mobile device into a longitudinal position and a latitudinal position;

comparing the longitudinal position and the latitudinal position of the login geo-location subsequent position data to longitudinal and latitudinal positions of the geo-fenced area of the remote job location; and determining that the subsequent position data is within the geo-fenced area when the longitudinal position and the latitudinal position of the subsequent position data is within the longitudinal and latitudinal positions of the geo-fenced area of the remote job location.

9. A remote employment management system, comprising:

one or more processors; and one or more memories storing instructions that, when executed by the one or more processors, cause the remote employment management system to:

provide remote access, over a network to a mobile device of a remote employee, to a user interface for accessing the remote employment management system;

receive initial position data, corresponding to an initial remote job location, captured by the mobile device, wherein the initial remote job location is assigned to the remote employee and associated with a primary remote job location for the remote employee;

determine that the initial position data, of the initial remote job location, is outside a geo-fenced area of the primary remote job location, wherein a log-in user interface element of the user interface is deactivated based on the initial position data being outside the geo-fenced area of the primary remote job location;

based on the determining that the initial position data is outside the geo-fenced area of the primary remote job location, receive alternate location data including one or more photographs captured by a camera of the mobile device;

verify the alternate location data captured by the mobile device matches the initial remote job location assigned to the remote employee using the one or more photographs;

receive subsequent position data captured by a global positioning system (GPS) of the mobile device;

determine that the subsequent position data is within the geo-fenced area of the primary remote job location, wherein the log-in user interface element of the user interface is activated based on the subsequent position data being within the geo-fenced area of the primary remote job location;

receive, via the activated log-in user interface element of the user interface, a login request from the mobile device when the mobile device is within the geo-fenced area of the primary remote job location;

based on the received login request, logging the mobile device of the remote employee into the remote employment management system when a current time is within a predetermined amount of time before or at a start time, or at or after an end time, wherein logging the mobile device into the remote employment management system generates a clock-in/clock-out record for the remote employee, the clock-in/clock-out record including a clock-in time at which the login request is received;

generating a pay summary module for the user interface, the pay summary module estimating pay for the remote employee based on a pay rate for the remote employee and the clock-in time;

adjusting the clock-in time, of the clock-in record, to correspond to a time of verification of the alternate location data matching the initial remote job location based on the one or more photographs; and automatically updating the pay summary module of the user interface with an adjusted estimated pay for the remote employee, when the clock-in time is adjusted, based on the pay rate for the remote employee and the adjusted clock-in time.

10. The remote employment management system of claim 9, wherein the instructions further cause the one or more processors to:

update the user interface to display federal and state employment laws to the remote employee based on the primary remote job location.

11. The remote employment management system of claim 9, wherein the instructions further cause the one or more processors to:

convert the received subsequent position data of the mobile device into a longitudinal position and a latitudinal position;

compare the longitudinal position and the latitudinal position of the subsequent position data to longitudinal and latitudinal positions of the geo-fenced area of the primary remote job location; and determine that the subsequent position data is within the geo-fenced area when the longitudinal position and the latitudinal position of the subsequent position data is within the longitudinal and latitudinal positions of the geo-fenced area of the primary remote job location assigned to the remote employee.

12. The method of claim 1, wherein the log-in user interface element of the user interface element is activated further based on a determination that the clock-in time, at which the log-in request is received, is within a predetermined amount of time before a start time for the primary remote job location.

13. The method of claim 1, further comprising:

based the logging of the mobile device of the remote employee into the remote employment management system, providing an update to the user interface of the mobile device of the remote employee, the update replacing the activated log-in user interface element with an activated log-out user interface element on the user interface.

14. The method of claim 13, further comprising:

receiving selection of the activated log-out user interface element, from the mobile device of the remote employee, after a duration of time elapsed from the clock-in time; and based on the received selection of the activated log-out user interface element, logging the mobile device out of the remote employment management system.

15. The method of claim 14, wherein the logging the mobile device out of the remote employment management system generates a clock-out time, for the clock-in/clock-out record, at which the selection of the activated log-out user interface element is received.

16. The method of claim 15, further comprising:

automatically updating the pay summary module of the user interface based on the pay rate for the remote employee and the duration of time between the adjusted clock-in time and the clock-out time.

17. The method of claim 15, further comprising:

automatically updating a labor record, stored in a database, with the adjusted clock-in time and the clock-out time of the remote employee.

18. The method of claim 1, further comprising:

providing remote access to a point-of-contact user over a network so that the point-of-contact user can request the adjusting of the clock-in time for the remote employee through a point-of-contact user interface of the remote employment management system.

19. The method of claim 18, further comprising:

automatically generating a push notification containing the clock-in time when the clock-in request is received; and transmitting the push notification to the point-of-contact user over the network, so that the point-of contact user has access to up-to-date information for the remote employee.

20. The method of claim 19, wherein the push notification further includes a clock-out time at which selection of an activated log-out user interface element is received.

* * * * *